(12) United States Patent
Lee et al.

(10) Patent No.: US 9,761,164 B2
(45) Date of Patent: Sep. 12, 2017

(54) METHOD FOR DISPLAYING SERVICE SCREEN AND ELECTRONIC DEVICE THEREOF

(71) Applicant: Samsung Electronics Co., Ltd., Gyeonggi-do (KR)

(72) Inventors: Yo-Han Lee, Gyeonggi-do (KR); Ki-Huk Lee, Gyeonggi-do (KR); Jae-Bong Chun, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 135 days.

(21) Appl. No.: 14/678,857

(22) Filed: Apr. 3, 2015

(65) Prior Publication Data
US 2015/0285976 A1   Oct. 8, 2015

(30) Foreign Application Priority Data
Apr. 4, 2014  (KR) .................. 10-2014-0040540

(51) Int. Cl.
*G09G 5/00* (2006.01)
*G09G 3/20* (2006.01)
*G02B 27/00* (2006.01)

(52) U.S. Cl.
CPC ........... *G09G 3/20* (2013.01); *G02B 27/0093* (2013.01)

(58) Field of Classification Search
CPC ............................. G09G 3/20; G02B 27/0093
See application file for complete search history.

(56) References Cited

U.S. PATENT DOCUMENTS

| 7,705,935 | B2 | 4/2010 | Gaudreau | |
|---|---|---|---|---|
| 2002/0021387 | A1 | 2/2002 | Larson | |
| 2010/0026720 | A1* | 2/2010 | Hotta | G06F 1/1616 345/652 |
| 2010/0295827 | A1* | 11/2010 | Lim | G09G 3/20 345/204 |
| 2011/0216045 | A1* | 9/2011 | Tsuchida | G06F 1/1616 345/204 |
| 2015/0015459 | A1* | 1/2015 | Cho | G02B 27/017 345/8 |

FOREIGN PATENT DOCUMENTS

| KR | 10-2003-0013385 | 2/2003 |
|---|---|---|
| KR | 10-2006-0134070 | 12/2006 |
| KR | 10-2012-0040320 | 4/2012 |

* cited by examiner

*Primary Examiner* — Adam R Giesy

(57) ABSTRACT

Disclosed are an apparatus and a method for displaying a service screen in an electronic device. The method includes: displaying a first service screen included in a first window on a display module; generating a second window including a second service screen; and displaying a service screen included in one of a plurality of windows corresponding to a viewing angle of a user with respect to the electronic device on the display module.

14 Claims, 35 Drawing Sheets

METHOD FOR DISPLAYING SERVICE SCREEN AND ELECTRONIC DEVICE THEREOF

CROSS-REFERENCE TO RELATED APPLICATION

The present application is related to and claims priority under 35 U.S.C. §119(a) to Korean Application Serial No. 10-2014-0040540, which was filed in the Korean Intellectual Property Office on Apr. 4, 2014, the entire content of which is hereby incorporated by reference.

TECHNICAL FIELD

The present disclosure relates to an apparatus and a method for displaying a service screen in an electronic device.

BACKGROUND

According to an increase in the use of multimedia services using electronic devices, information to be processed by the electronic device and information to be displayed by the electronic device have increased. Accordingly, the use of electronic devices including a touch screen which can make better use of a space to increase the size of a display module has increased.

The touch screen corresponds to an input/output device for inputting and displaying information on one screen. Accordingly, when the touch screen is used, the electronic device may remove a separate input device such as a keypad, thereby increasing a display area.

SUMMARY

Portable electronic devices such as smart phones, tablet Personal Computers (PCs), and mobile phones have limit on increasing a display area due to portability thereof. Accordingly, the portable electronic device has limited information which can be displayed on a display module.

To address the above-discussed deficiencies, it is a primary object to provide an apparatus and a method for efficiently displaying a plurality of service screens in an electronic device.

Various embodiments of the present disclosure provide an apparatus and a method for generating one or more service screens in an electronic device based on a user's viewing angle.

Various embodiments of the present disclosure provide an apparatus and a method for switching a service screen in an electronic device based on a user's viewing angle.

Various embodiments of the present disclosure provide an apparatus and a method for providing a multitasking service in an electronic device based on a user's viewing angle and by using a plurality of windows.

In accordance with an aspect of the present disclosure, a method of displaying a service screen in an electronic device is provided. The method includes: displaying a first service screen included in a first window on a display module; generating a second window including a second service screen; and displaying one of the first service screen and the second service screen included in one of the first window and the second window corresponding to a viewing angle of a user with respect to the electronic device on the display module.

In accordance with another aspect of the present disclosure, an electronic device is provided. The apparatus includes: a display module; and a processor configured to control the display module to display a first service screen included in a first window on the display module, generate a second window including a second service screen, and control the display module to display one of the first service screen and the second service screen included in one of the first window and the second window corresponding to a viewing angle of a user with respect to an electronic device on the display module.

In accordance with another aspect of the present disclosure, an electronic device is provided. The apparatus includes: a polarizing display; and a processor configured to control the polarizing display to display a first service screen included in a first window, control the polarizing display to display a second service screen included in a second window, wherein the first service screen is viewed in a first viewing angle of a user according to a first view angle of the polarizing display, and wherein the second service screen is viewed in a second viewing angle of the user according to a second view angle of the polarizing display.

In accordance with another aspect of the present disclosure, a method of displaying a service screen in an electronic device is provided. The method includes: displaying a first service screen included in a first window, displaying a second service screen included in a second window, wherein the first service screen is viewed in a first viewing angle of a user according to a first view angle of the polarizing display, and wherein the second service screen is viewed in a second viewing angle of the user according to a second view angle of the polarizing display.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

Figure 1:
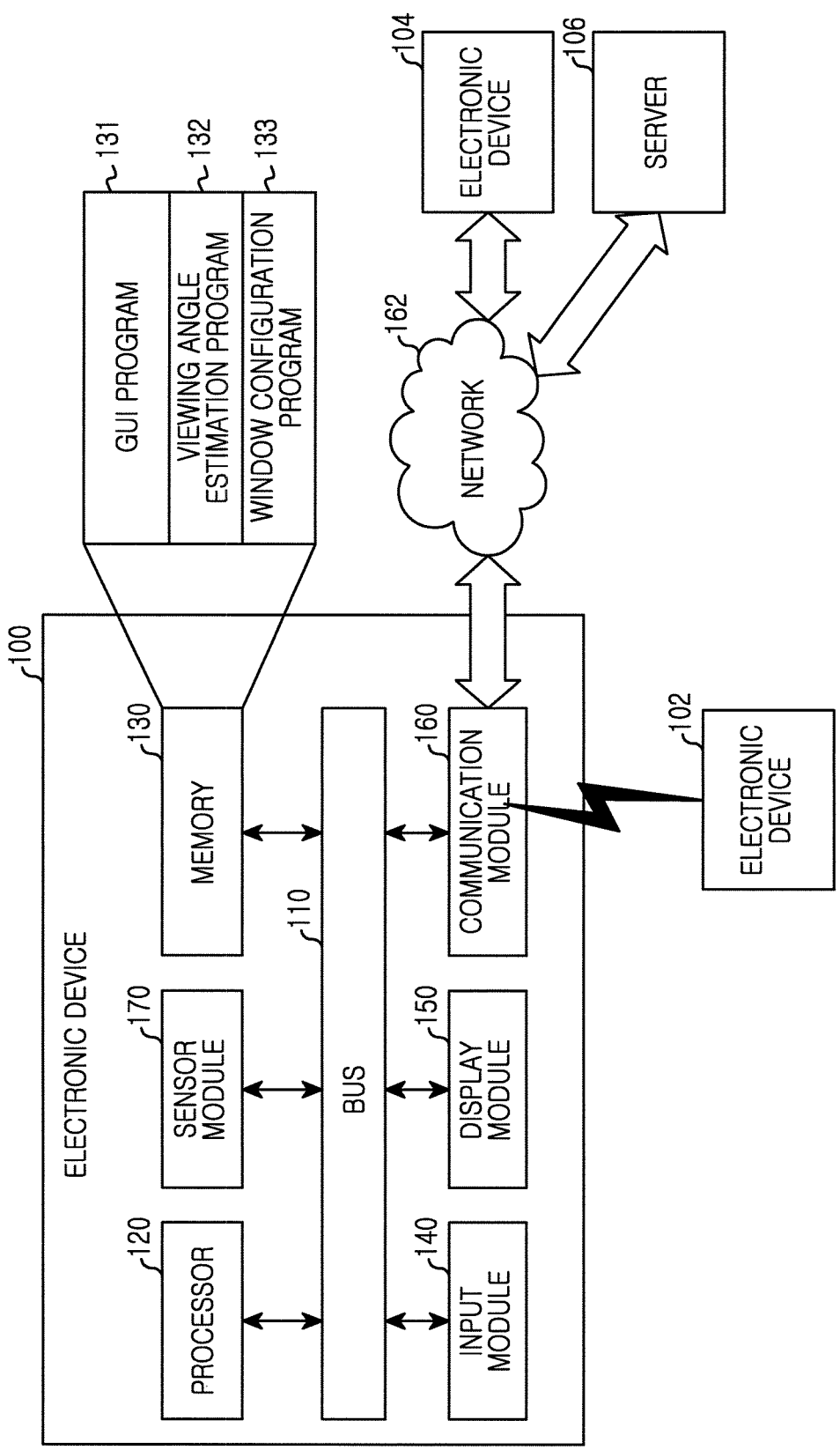
FIG. 1 is a block diagram of an electronic device according to various embodiments of the present disclosure.

FIGS. 1 through 19B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Various embodiments of the present disclosure will be described below in detail with reference to the accompanying drawings. In the following description, detailed descriptions of well-known functions or configurations will be omitted since they would unnecessarily obscure the subject matters of the present disclosure. Furthermore, terms to be described below have been defined by considering functions in embodiments of the present disclosure, and may be defined differently depending on a user or operator's intention or practice. Therefore, the definitions of such terms are based on the descriptions of the entire present specification.

Various embodiments of the present disclosure provide an apparatus and method for displaying image information in an electronic device.

Examples of the electronic device according to various embodiments of the present disclosure include one or more of a smart phone, a tablet personal computer (PC), a mobile phone, a video phone, an electronic-book reader, a desktop PC, a laptop PC, a netbook computer, a Personal Digital Assistant (PDA), a portable multimedia player (PMP), an MP3 player, an accessory, an appcessory, a camera, a wearable device, a wrist watch, a refrigerator, an air-conditioner, a cleaner, an intelligent robot, a television, a digital video disk (DVD) player, a stereo, an oven, a microwave oven, a washing machine, an electronic bangle, an electronic necklace, an air cleaner, and a digital photo frame, a medical equipment, a navigation device, a satellite signal receiver, an event data recorder (EDR), a flight data recorder (FDR), a set-top box, a TV box, an electronic dictionary, a vehicle infotainment device, a electronic equipment for ship, an avionics device, a security equipment, an electronic clothing, an electronic key, a camcorder, a game console, a head-mounted display (HMD) a flat panel display device, an electronic album, a furniture or a portion of a building/structure including an electronic device, an electronic board, an electronic signature receiving device, and a protector. It is apparent that the electronic device according to various embodiments of the present disclosure is not limited to the above-described devices.

Hereinafter, in various embodiments of the present disclosure, a window can refer to a display unit including at least one service screen which can be displayed on a display module. According to one embodiment, when an electronic device includes a plurality of windows, one of the plurality of windows can be displayed on a display module and the remaining windows can be stored in a particular area of a memory without being displayed on the display module.

FIG. 1 is a block diagram of an electronic device according to various embodiments of the present disclosure.

Referring to FIG. 1, an electronic device 100 includes a bus 110, a processor 120, a memory 130, an input module (input interface) 140, a display 150, a communication module (communication interface) 160, and a sensor module 170. One or more of the processor 120 and the memory 130 can be plural.

The bus 110 connects the components included in the electronic device 100 and control communication between the components included in the electronic device 100.

The processor 120 controls the electronic device 100 to provide various services. For example, the processor 120 can decode commands received from one or more different components (for example, the memory 130, the input module (input interface) 140, the display module 150, the communication module (communication interface) 160, and the sensor module 170) included in the electronic device 100 through the bus 110, and perform calculations or data processing according to the decoded commands.

The processor 120 executes one or more programs stored in the memory 130 to control the electronic device 100 to provide various services.

According to one embodiment, the processor 120 estimates a viewing angle of the user with respect to the electronic device 100 by executing a viewing angle estimation program 132 stored in the memory 130. For example, the processor 120 can estimate a viewing angle of the user with respect to the electronic device 100 by using sensing data collected through at least one of a geomagnetic sensor and an acceleration sensor included in the sensor module 170. In another example, the processor 120 estimates a viewing angle of the user with respect to the electronic device 100 by using an image collected through an image sensor (not shown).

According to one embodiment, the processor 120 generates a window including at least one service screen by executing a window configuration program 133 stored in the memory 130. For example, when selection for notification information displayed on the display module 150 is detected, the processor 120 generates a window based on the viewing angle of the user estimated using the viewing angle estimation program 132. For example, if the viewing angle of the user is included in a predetermined range when the selection for the notification information displayed on the display module 150 is detected, the processor 120 generates a window including a service screen corresponding to the notification information. For example, the processor 120 generates a second window including at least one second service screen different from a first window including at least one first service screen displayed on the display module 150. The first window and the second window can be selectively displayed on the display module 150 based on the viewing angle of the user. The first window and the second window can be called a multi-window. The predetermined range refers to an angle range for changing a service screen displayed on the display module 150.

In another example, when selection for one application program is detected from an application program list displayed on the display module 150, the processor 120 can generate a window based on a viewing angle of the user. For example, if the viewing angle of the user is included in a second predetermined range when the selection for the one application program is detected from the application program list, the processor 120 can generate a window including a service screen of the application program selected from the application program list.

In another example, when selection for a menu is detected during the execution of the application program, the processor 120 can generate a window based on a viewing angle of the user. For example, if the viewing angle of the user is included in the second predetermined range when the selection for the menu is detected during the execution of the application program, the processor 120 can generate a window including a service screen corresponding to the selected menu.

According to one embodiment, the processor 120 switches the configuration of windows by executing the window configuration program 133 stored in the memory 130. For example, when a screen switching input is provided through the input module (input interface) 140, the processor 120 can switch a service screen of a window (first window or second window) displayed on the display module 150. In another example, when a configuration change input is provided through the input module (input interface) 140, the processor 120 can exchange service screens included in the first window and the second window.

According to one embodiment, the processor 120 graphically provides a user interface to the display module 150 by executing a graphic user interface program 131 stored in the memory 130. For example, the processor 120 can control the display to display a service screen of at least one of a plurality of windows on the display module 150 based on a viewing angle of the user.

The memory 130 stores commands or data received from or generated by one or more components (for example, the processor 120, the input module (input interface) 140, the display module 150, the communication module (communication interface) 160, and the sensor module 170) included in the electronic device 100.

According to one embodiment, the memory 130 stores one or more programs for services of the electronic device 100. For example, the memory 130 can include one or more of the Graphic User Interface (GUI) program 131, the viewing angle estimation program 132, and the window configuration program 133.

The GUI program 131 includes at least one software component for graphically providing a user interface to the display module 150. For example, the GUI program 131 can control the display to display a service screen included in at least one of a plurality of windows on the display module 150 based on a viewing angle of the user.

The viewing angle estimation program 132 includes at least one software component for estimating a viewing angle of the user with respect to the electronic device 100.

The window configuration program 133 includes at least one software component for generating a window including at least one service screen.

The input module (input interface) 140 transmits commands or data generated by selection of the user to the processor 120 or the memory 130 through the bus 110. For example, the user input module (input interface) 140 can include one or more of a keypad including at least one hardware button and a touch panel detecting touch information.

The display module (display) 150 displays an image, a video, or data for the user. For example, the display module 150 can display information on an application program driven by the processor 120. In another example, the display module 150 can display a service screen including at least one of the plurality of windows generated by the processor 120.

The communication module (communication interface) 160 connects communication between the electronic device 100 and at least one of other electronic devices 102 or 104, a server 106, or at least one neighboring device. For example, the communication module (communication interface) 160 can support a short-range communication protocol (for example, WiFi, BLUETOOTH (BT), or Near Field Communication (NFC)), a network communication protocol (for example, Internet, Local Area Network (LAN), Wide Area Network (WAN), telecommunication network, cellular network, satellite network, or Plain old Telephone service (PTOS)), or a wired communication protocol (for example, Universal Serial Bus (USB) or a High Definition Multimedia Interface (HDMI)). At this time, the communication protocol (for example, short range communication protocol, network communication protocol, or wired communication protocol) supports middleware or an Application Programming Interface (API) of the memory 130. Another electronic device 102 or 104 is a neighboring device of the electronic device 100, and can be the same type device as the electronic device 100 or include a different type device.

The sensor module 170 measures a physical quantity or detects an operation state of the electronic apparatus, and convert the measured or detected information to an electrical signal. For example, the sensor module 170 can estimate movement of the user of the electronic device 100 by using one or more of an image sensor, a gesture sensor, a gyro sensor, an acceleration sensor, a grip sensor, a proximity sensor, and an illumination sensor.

In the above described embodiment, the processor 120 generates windows by executing software components stored in the memory 130 within one module, and make a control to display a service screen included in at least one of the plurality of windows on the display module 150.

Figure 2:
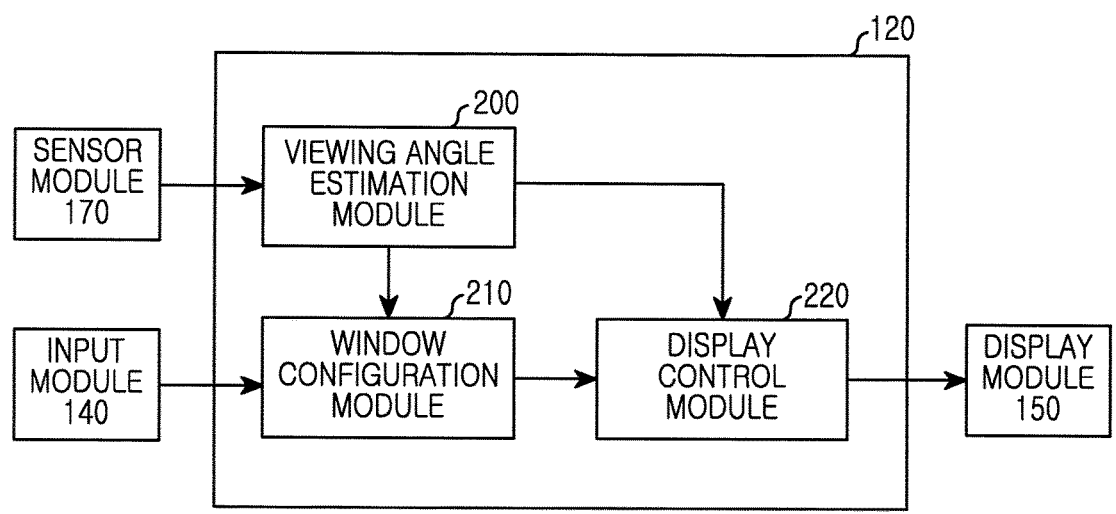
FIG. 2 is a detailed block diagram of a processor according to various embodiments of the present disclosure.

In another example, as illustrated in FIG. 2, the processor 120 includes, as separate modules, the components for generating windows and making a control to display a service screen included in at least one of the plurality of windows on the display module 150.

FIG. 2 is a detailed block diagram of the processor according to various embodiments of the present disclosure.

Referring to FIG. 2, the processor 120 includes a viewing angle estimation module 200, a window configuration module 210, and a display control module 220.

The viewing angle estimation module 200 estimates a viewing angle of the user with respect to the electronic device 100. At this time, the viewing angle estimation module 200 estimates the viewing angle of the user with respect to the electronic device 100 by executing the viewing angle estimation program 132 stored in the memory 130. For example, the viewing angle estimation module 200 can estimate the viewing angle of the user with respect to the electronic device 100 by using sensing data collected through at least one of a geomagnetic sensor and an acceleration sensor included in the sensor module 170. In another example, the viewing angle estimation module 200 can estimate the viewing angle of the user with respect to the electronic device 100 by using an image collected through an image sensor.

The window configuration module 210 generates a window including at least one service screen. At this time, the window configuration module 210 generates at least one window including different service screens by executing the window configuration program 133 stored in the memory 130. For example, when selection for notification information displayed on the display module 150 is detected, the window configuration module 210 can generate a window based on the viewing angle of the user estimated using the viewing angle estimation program 200. For example, if the viewing angle of the user is included in a second predetermined range when the selection for the notification information displayed on the display module 150 is detected, the window configuration module 210 can generate a window including a service screen corresponding to the notification information.

In another example, when selection for one application program is detected from an application program list displayed on the display module 150, the window configuration module 210 can generate a window based on a viewing angle of the user. For example, if the viewing angle of the user is included in a second predetermined range when the selection for the one application program is detected from the application program list, the window configuration module 210 can generate a window including a service screen of the application program selected from the application program list.

In another example, when selection for a menu is detected during the execution of the application program, the window configuration module 210 can generate a window based on a viewing angle of the user. For example, if the viewing angle of the user is included in the second predetermined range when the selection for the menu is detected during the execution of the application program, the window configuration module 210 can generate a window including a service screen corresponding to the selected menu.

The window configuration module 210 switches the configuration of windows according to input information provided through the input module (input interface) 140. For example, when a screen switching input is provided through the input module (input interface) 140, the window configuration module 210 can switch a service screen of a window (first window or second window) displayed on the display module 150. In another example, when a configuration change input is provided through the input module (input interface) 140, the window configuration module 210 can exchange service screens included in the first window and the second window.

The display control module 220 graphically provides a user interface to the display module 150. At this time, the display control module 220 graphically provides a user interface to the display module 150 by executing the graphic user interface program 131 stored in the memory 130. For example, the display control module 220 can control the display to display a service screen of at least one of the plurality of windows (first window and second window) generated by the window configuration module 210 on the display module 150 based on the viewing angle of the user estimated by the viewing angle estimation module 200.

In the above described embodiment, the electronic device 100 generates a window including at least one service screen and controls the display to display a service screen included in at least one of the plurality of windows on the display module 150 by using the processor 120.

In the above described embodiment, the electronic device 100 generates a window including at least one service screen and controls the display to display a service screen included in at least one of the plurality of windows on the display module by using a separate control module.

Figure 3:
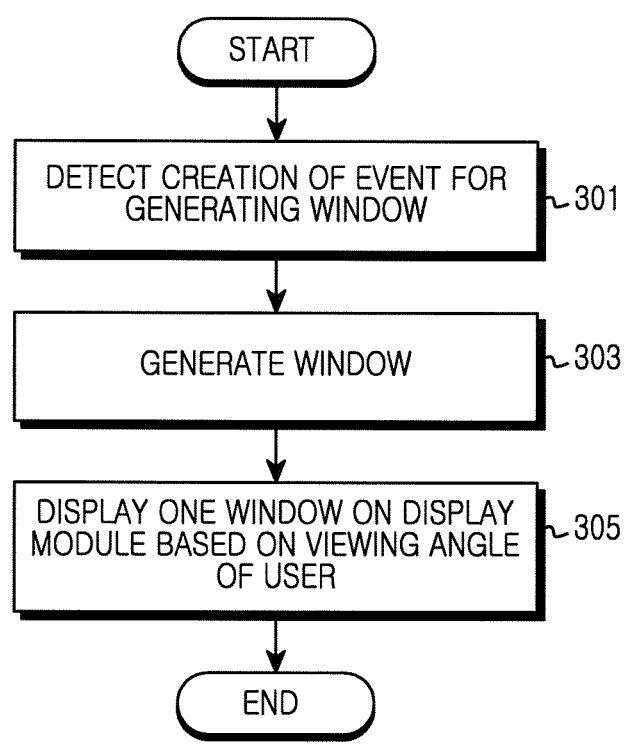
FIG. 3 illustrates a process in which an electronic device generates and displays a window according to various embodiments of the present disclosure.

FIG. 3 illustrates a process in which an electronic device generates and displays a window according to various embodiments of the present disclosure.

Referring to FIG. 3, the electronic device (for example, the electronic device 100 of FIG. 1) detects the occurrence of an event for generating a window in operation 301. For example, the electronic device can identify whether the event for generating the window is occurred based on a viewing angle of the user.

When the electronic device detects the occurrence of the event for generating the window, the electronic device generates a window including at least one service screen in operation 303. For example, when the event for generating the window is occurred, the electronic device can generate a second window including at least one second service screen different from at least one first service screen included in a first window displayed on the display module 150. The second service screen can include a service screen of an application program different from that of the first service screen or another service screen of the same application program as that of the first service screen.

The electronic device displays a service screen included in at least one of the plurality of windows on the display module 150 based on a viewing angle of the user in operation 305. For example, the electronic device can display a service screen included in one window corresponding to the viewing angle of the user on the display module 150.

Figure 4:
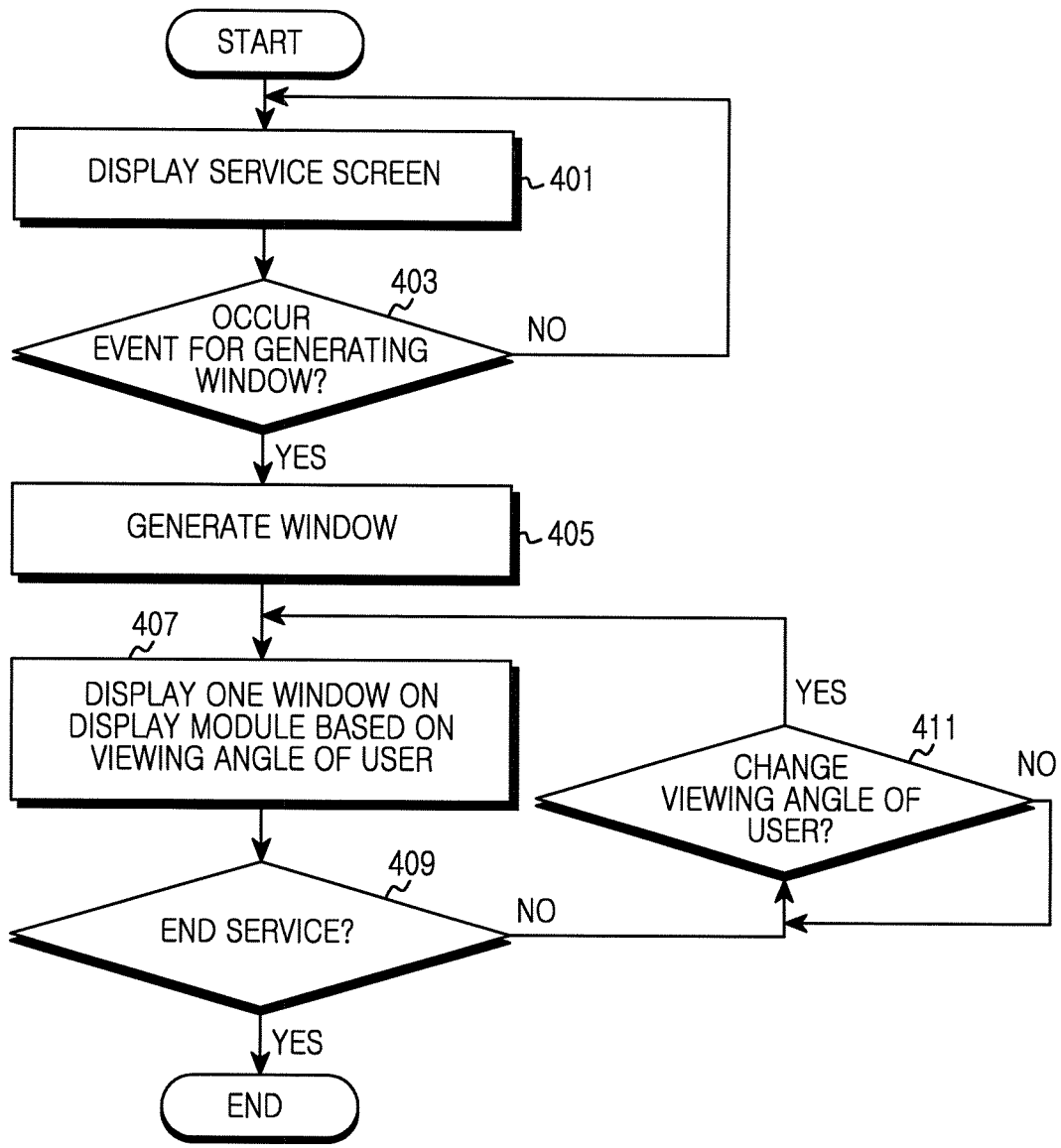
FIG. 4 illustrates a process in which an electronic device generates and displays a window based on a viewing angle of a user with respect to an electronic device according to various embodiments of the present disclosure.

FIG. 4 illustrates a process in which an electronic device generates and displays a window based on a viewing angle of the user according to various embodiments of the present disclosure.

Figure 6A:
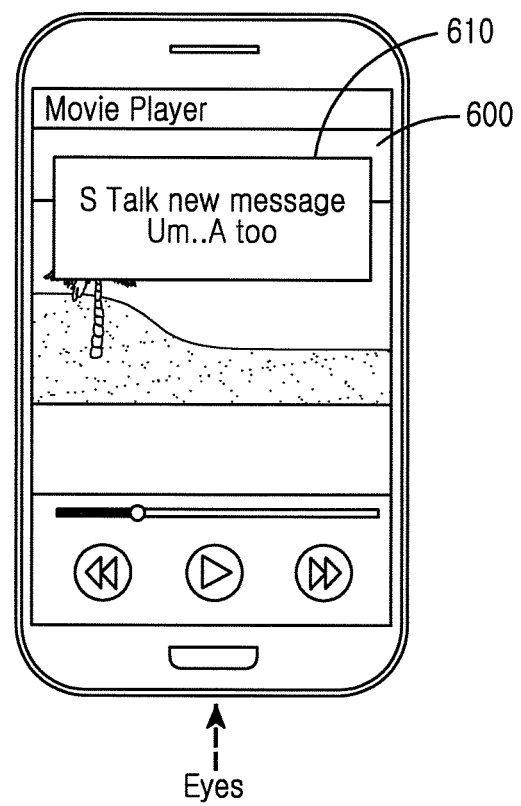
FIGS. 6A, 6B, 6C and 6D illustrate screen configurations in which an electronic device generates windows based on notification information according to various embodiments of the present disclosure.
Figure 6B:
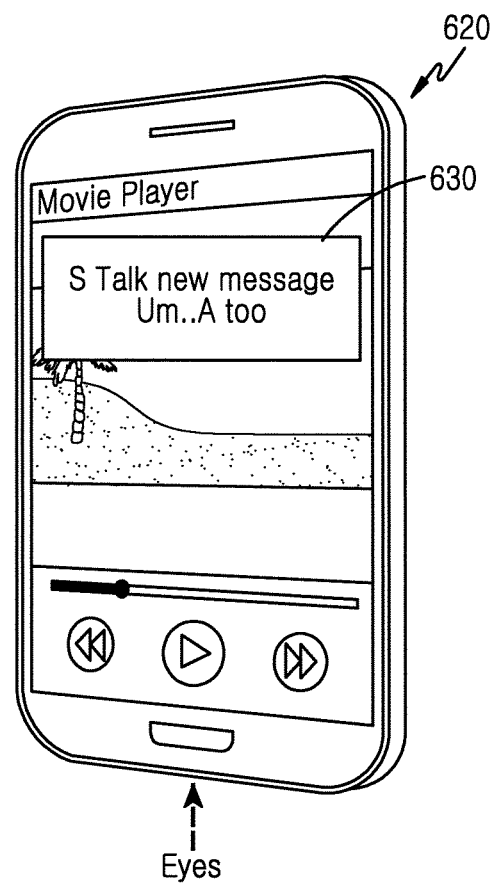
Figure 8:
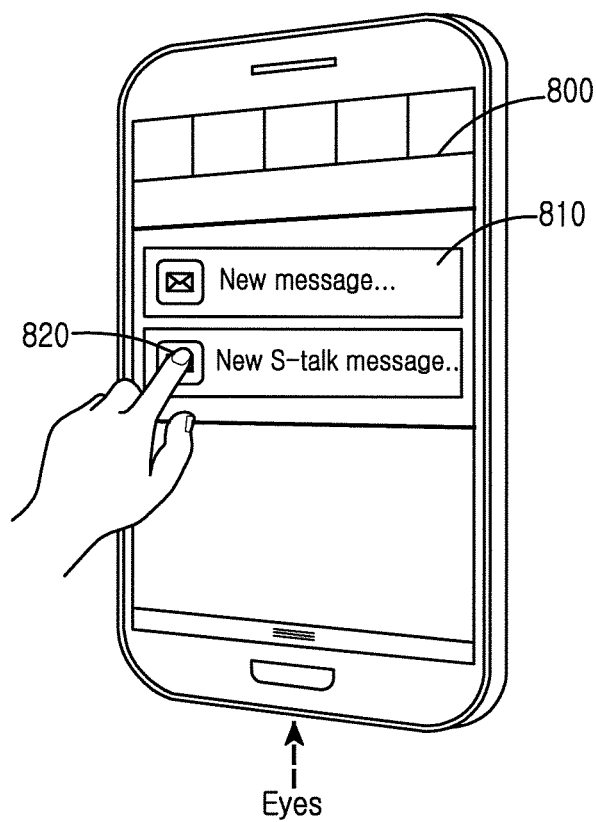
FIG. 8 illustrates a screen configuration in which an electronic device generates a window by using a notification panel according to various embodiments of the present disclosure.
Figure 10:
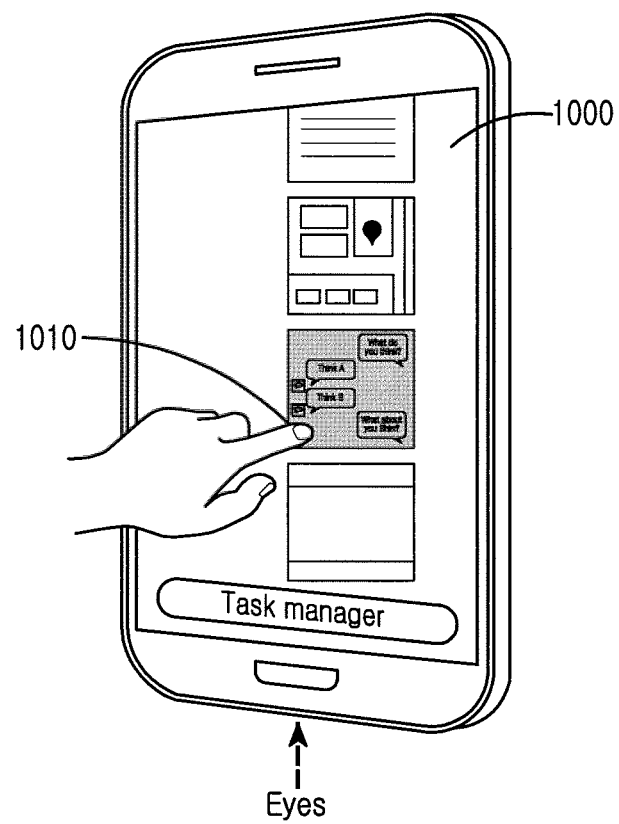
FIG. 10 illustrates a screen configuration in which an electronic device generates a window by using a task manager according to various embodiments of the present disclosure.
Figure 12A:
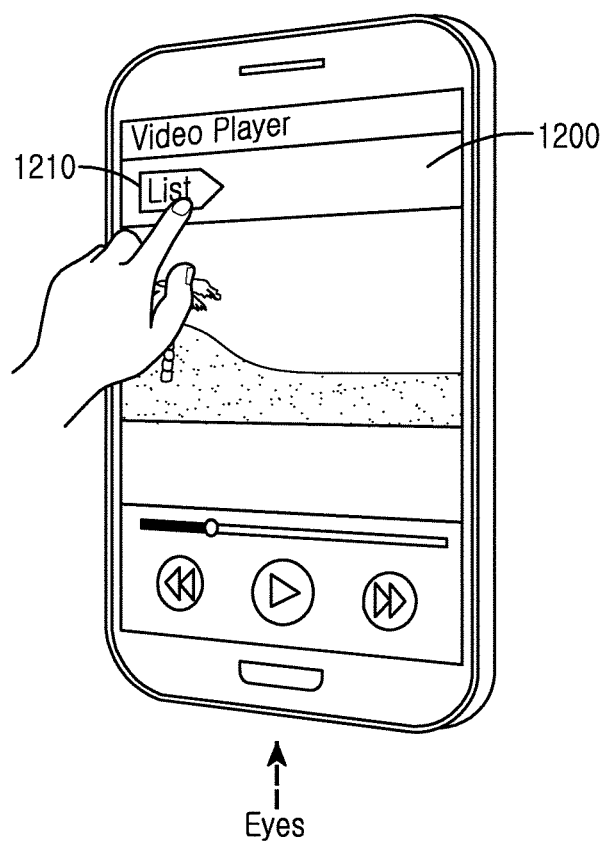
FIGS. 12A, 12B, 12C and 12D illustrate screen configurations in which an electronic device generates windows based on menu selection information according to various embodiments of the present disclosure.
Figure 15A:
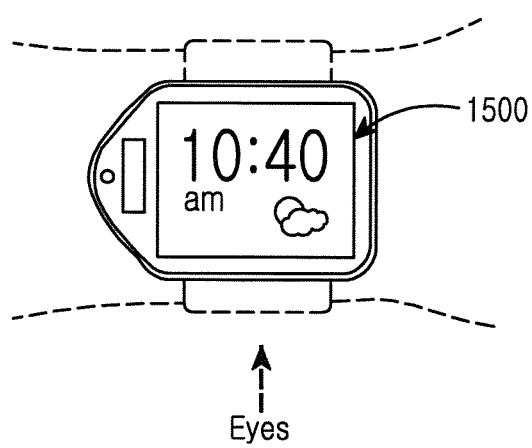
FIGS. 15A, 15B, 15C and 15D illustrate screen configurations in which an electronic device displays notification information according to various embodiments of the present disclosure.
Figure 18A:
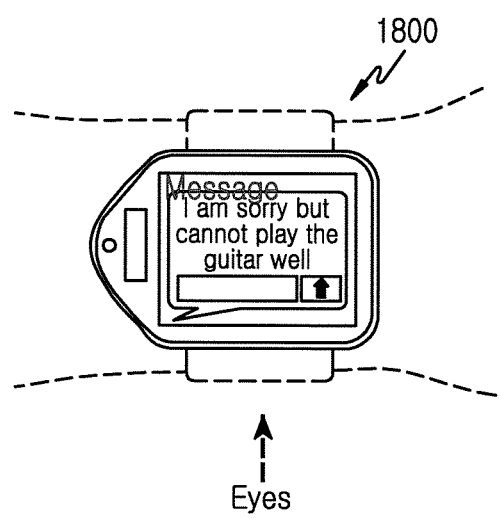
FIGS. 18A, 18B, 18C, 18D, 18E and 18F illustrate screen configurations in which an electronic device generates windows based on a change in a viewing angle of a user according to various embodiments of the present disclosure.

Referring to FIG. 4, the electronic device (for example, the electronic device 100 of FIG. 1) displays a service screen on the display module 150. For example, the electronic device can display dynamic image screens 600 and 1200 reproduced by a dynamic image reproduction program on the display module 150 as illustrated in FIGS. 6A and 12A. In another example, the electronic device can display notification information 810 on the display module 150 by using a notification panel 800 as illustrated in FIG. 8. In still another example, the electronic device can display an application program list 1000 managed by a task manager on the display module 150 as illustrated in FIG. 10. In yet another example, the electronic device can display an idle screen 1500 of the electronic device on the display module 150 as illustrated in FIG. 15A. In still yet another example, the electronic device can display a message received by a messenger program on the display module 150 as illustrated in FIG. 18A. The notification panel can have a control function for collecting and displaying pieces of notification information generated by the electronic device like a quick panel.

The electronic device identifies whether an event for generating a window is occurred in operation 403. For example, the electronic device can identify whether the event for generating the window is occurred based on a viewing angle of the user.

When the occurrence of the event for generating the window is not detected in operation 403, the electronic device displays a service screen on the display module 150 in operation 401.

When the occurrence of the event for generating the window is detected in operation 403, the electronic device generates a window including at least one service screen in operation 405.

The electronic device displays a service screen included in at least one of the plurality of windows (first window and second window) on the display module 150 based on a viewing angle of the user in operation 407. For example, the electronic device can display a service screen included in one of the plurality of windows corresponding to the viewing angle of the user on the display module 150.

The electronic device identifies whether the service ends in operation 409.

When the service does not end in operation 409, the electronic device identifies whether the viewing angle of the user changes in operation 411. For example, the electronic device can identify whether the viewing angle of the user changes based on a range including the viewing angle of the user.

When the viewing angle of the user does not change in operation 411, the electronic device identifies whether the service ends in operation 409.

When the viewing angle of the user changes in operation 411, the electronic device displays a service screen included in a window corresponding to the changed viewing angle of the user on the display module 150 in operation 407.

When the service ends in operation 409, the electronic device ends the algorithm.

Figure 5:
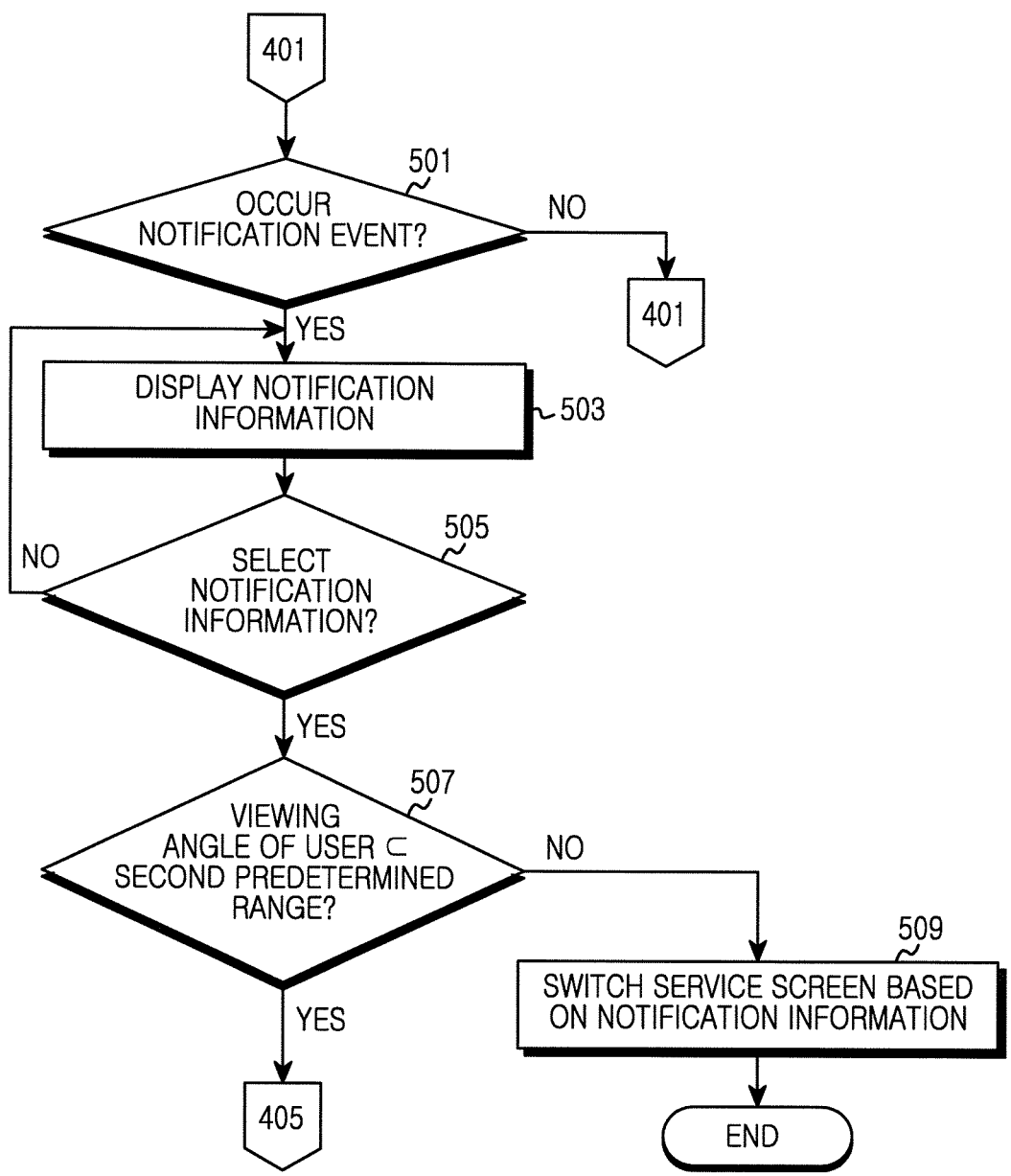
FIG. 5 illustrates a process in which an electronic device detects the occurrence of an event for generating a window based on notification information according to various embodiments of the present disclosure.

FIG. 5 illustrates a process in which an electronic device detects the occurrence of an event for generating a window based on notification information according to various embodiments of the present disclosure. Hereinafter, a process for detecting whether an event for generating a window is occurred will be described with reference to screen configurations illustrated in FIGS. 6A to 6D.

Referring to FIG. 5, when a service screen 600 according to the execution of an application program is displayed on the display module 150 as illustrated in FIG. 6A in operation 401 of FIG. 4, the electronic device (for example, the electronic device 100 of FIG. 1) identifies whether a notification event is occurred in operation 501. For example, the electronic device can identify whether a notification event corresponding to message reception is occurred. In another example, the electronic device can identify whether a notification event is occurred based on schedule configuration information. In still another example, the electronic device can identify whether a notification event corresponding to call reception is occurred.

When the notification event is not occurred in operation 501, the electronic device displays a service screen corresponding to the execution of the application program on the display module in operation 401 of FIG. 4.

When the notification event is occurred in operation 501, the electronic device displays notification information on the display module in operation 503. For example, the electronic device can display the notification information on the display module 150 through a popup window 610 as illustrated in FIG. 6A. When the viewing angle of the user changes, the electronic device transforms a graphic element displayed on the display module 150 and display the change in the viewing angle of the user. For example, when the viewing angle of the user changes as indicated by reference numeral 620 in FIG. 6B, the electronic device can display the change in the viewing angle of the user by controlling a layout of the popup window 610 displaying the notification information to be asymmetric based on the viewing angle of the user as indicated by reference numeral 630.

Figure 6C:
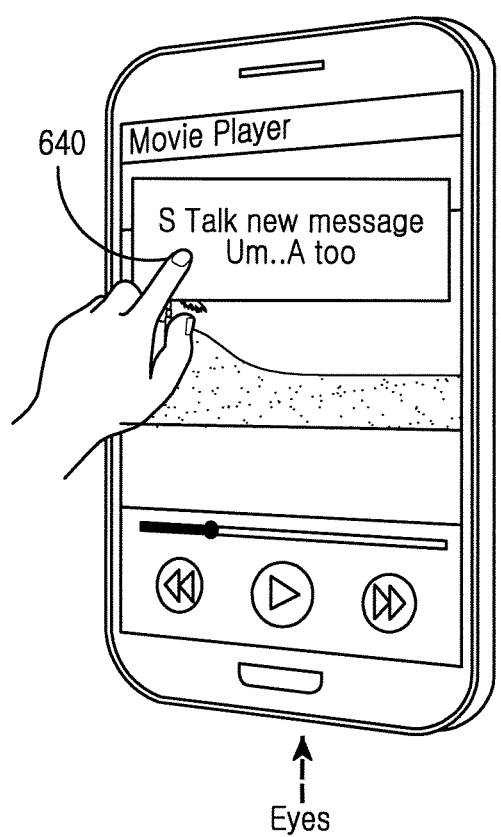

The electronic device identifies whether selection for the notification information is detected in operation 505. For example, the electronic device can identify whether a touch input for the notification information displayed on the display module 150 is detected as illustrated in FIG. 6C.

When the selection for the notification information is not detected in operation 505, the electronic device maintains the display of the notification information in operation 503.

When the selection for the notification information is detected in operation 505, the electronic device identifies whether the viewing angle of the user is included in a second predetermined range in operation 507. For example, the electronic device can identify whether the viewing angle of the user is included in the second predetermined range at the time when the selection for the notification information is detected as illustrated in FIG. 6C. The second predetermined range refers to a reference angle range for determining whether the window is generated.

Figure 6D:
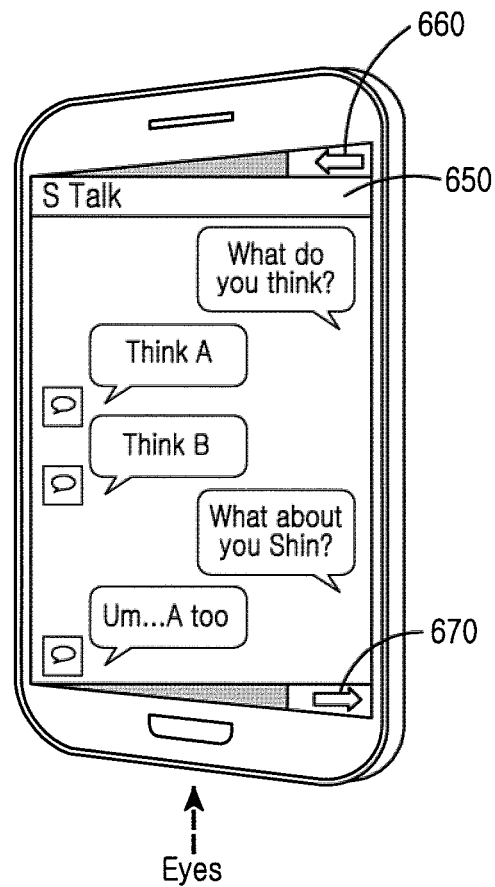

When the viewing angle of the user is included in the second predetermined range in operation 507, the electronic device generates a window including at least one service screen in operation 405 of FIG. 4. For example, the electronic device can generate a window including a service screen corresponding to the notification information. When the window is generated, the electronic device displays a service screen 650 included in the window of the plurality of windows corresponding to the second predetermined range on the display module 150 as illustrated in FIG. 6D. At this time, when the viewing angle of the user changes, the electronic device transforms a graphic element displayed on the display module 150 and displays the change in the viewing angle of the user. For example, the electronic device can display information on the viewing angle of the user recognized by the electronic device by controlling a layout of the service screen 650 to be asymmetric based on the viewing angle of the user as indicated by reference numeral 630 in FIG. 6D.

When the viewing angle of the user is not included in the second predetermined range in operation 507, the electronic device switches the service screen of the first window displayed on the display module 150 to a service screen corresponding to notification information in operation 509.

In the above described embodiment, when the viewing angle of the user is included in the second predetermined range at the time when the selection for the notification information is detected, the electronic device generates a window including at least one service screen. Accordingly, the electronic device displays information on the viewing angle of the user recognized by the electronic device, so as to allow the user to recognize whether an event for generating the window is occurred when the user selects the notification information. For example, when the notification information is displayed, the electronic device can display information on whether the viewing angle of the user recognized by the electronic device is included in the second predetermined range on the display module 150.

In the above described embodiment, when the window is generated, the electronic device displays a service screen of one of the plurality of windows corresponding to the viewing angle of the user on the display module 150. In this case, the electronic device switches the service screen included in the window displayed on the display module 150 to another service screen based on input information provided through the input module (input interface) 140. For example, the electronic device can display the service screen 650 of the notification information included in the window corresponding to the second predetermined range on the display module 150 as illustrated in FIG. 6D. At this time, the electronic device displays a switching icon 670 for the service screen 650 on the display module 150. When an input of the switching icon 670 is detected, the electronic device switches the service screen 650 of the window displayed on the display module 150 to another service screen based on the input of the switching icon 670. In another example, the electronic device switches the service screen 650 of the window displayed on the display module 150 to another service screen based on a gesture input corresponding to the service screen switching. The gesture includes at least one piece of touch information provided through the input module (input interface) 140, motion information of the electronic device detected through the sensor module 170, and motion information of the user detected through the sensor module 170.

Further, the electronic device changes the configuration of windows based on input information provided through the input module (input interface) 140. For example, when an input of a configuration change icon 660 is detected in FIG. 6D, the electronic device can change the arrangement of the first window and the second window. For example, the electronic device can change a viewing angle of the user corresponding to each of the windows. In another example, when the input of the configuration change icon 660 is detected in FIG. 6D, the electronic device can exchange service screens included in the first window and the second window. In still another example, the electronic device can exchange the service screens included in the first window and the second window based on the gesture input corresponding to the service screen switching.

Figure 7:
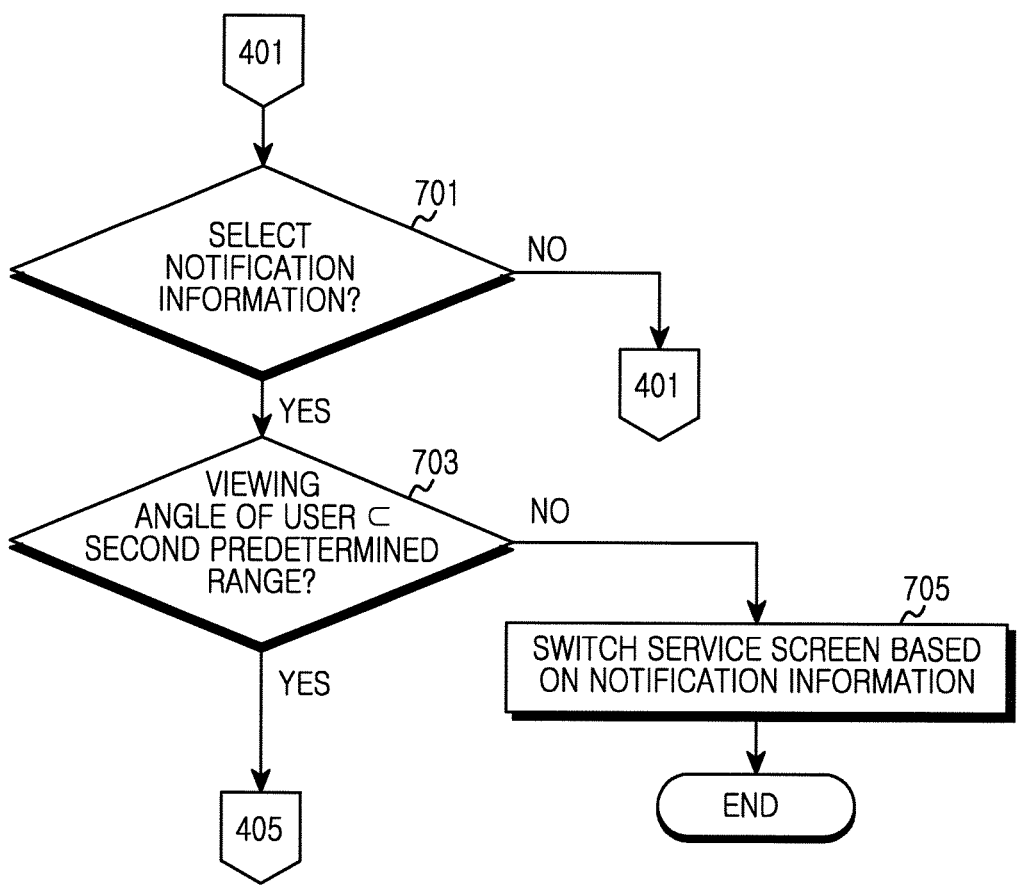
FIG. 7 illustrates a process in which an electronic device detects the occurrence of an event for generating a window based on notification information according to various embodiments of the present disclosure.

FIG. 7 illustrates a process in which an electronic device detects the occurrence of an event for generating a window based on notification information according to various embodiments of the present disclosure. Hereinafter, a process for detecting whether an event for generating a window is occurred will be described with reference to a screen configuration illustrated in FIG. 8.

Referring to FIG. 7, when notification information 810 is displayed on the display module 150 by using a notification panel 800 as illustrated in FIG. 8A in operation 401 of FIG. 4, the electronic device identifies whether selection for the notification information is detected in operation 701. For example, the electronic device can identify whether a touch input 820 for the notification information displayed on the display module 150 is detected as illustrated in FIG. 8.

When the selection for the notification information is not detected in operation 701, the electronic device maintains the display of the notification information 810 by using the notification panel 800 in operation 401 of FIG. 4. In this case, the electronic device changes the display of the notification information based on a viewing angle of the user. For example, the electronic device can display the change in the viewing angle of the user by controlling a layout of the notification information 810 to be asymmetric based on the viewing angle of the user as illustrated in FIG. 8.

When the selection for the notification information is detected in operation 701, the electronic device identifies whether the viewing angle of the user is included in a second predetermined range in operation 703. For example, the electronic device can identify whether the viewing angle of the user is included in the second predetermined range at the time when the selection for the notification information is detected as illustrated in FIG. 8. The second predetermined range refers to a reference angle range for determining whether the window is generated.

When the viewing angle of the user is included in the second predetermined range in operation 703, the electronic device generates a window including at least one service screen in operation 405 of FIG. 4. For example, the electronic device can generate a window including a service screen corresponding to the notification information. When the window is generated, the electronic device displays a service screen 650 included in the window of the plurality of windows corresponding to the second predetermined range on the display module 150 as illustrated in FIG. 6D. At this time, when the viewing angle of the user is included in the second predetermined range, the electronic device transforms or adds a graphic element displayed on the display module 150 and displays the change in the viewing angle of the user. For example, the electronic device can display information on the viewing angle of the user recognized by the electronic device by controlling a layout of the service screen 650 to be asymmetric based on the viewing angle of the user as indicated by reference numeral 630 in FIG. 6D.

When the viewing angle of the user is not included in the second predetermined range in operation 703, the electronic device switches the service screen of the first window displayed on the display module 150 to a service screen corresponding to notification information in operation 705.

Figure 9:
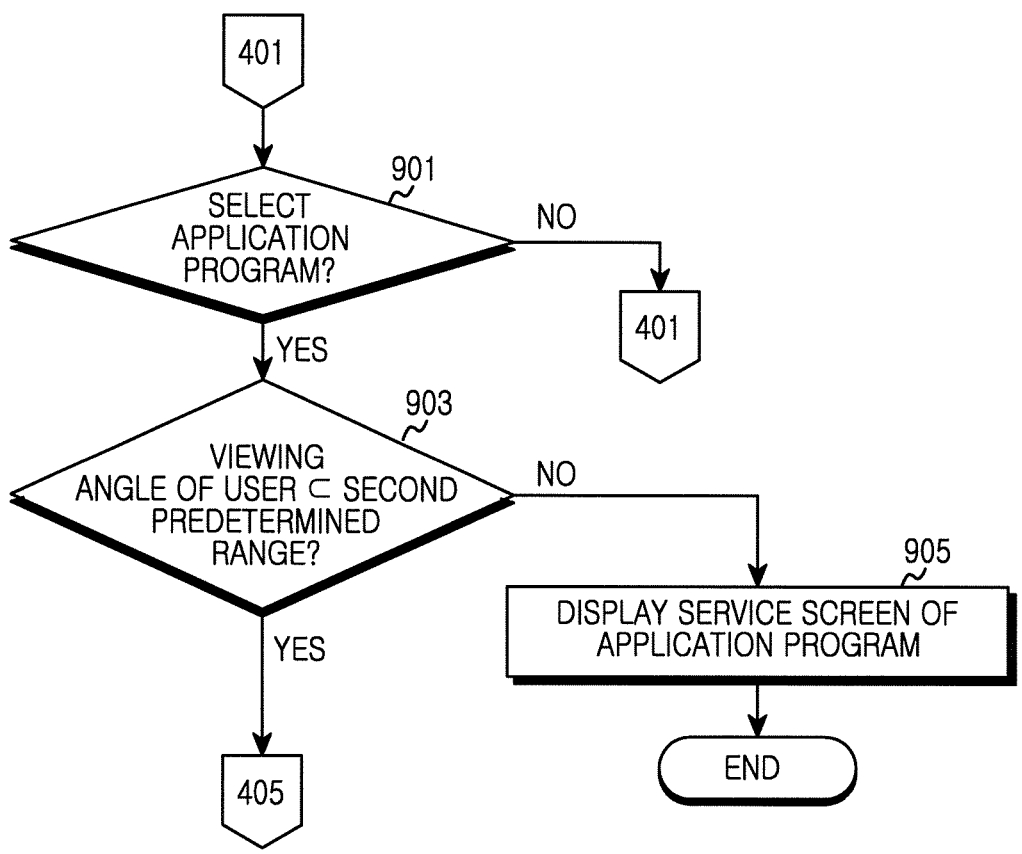
FIG. 9 illustrates a process in which an electronic device detects the occurrence of an event for generating a window based on application program execution information according to various embodiments of the present disclosure.

FIG. 9 illustrates a process in which an electronic device detects the occurrence of an event for generating a window based on application program execution information according to various embodiments of the present disclosure. Hereinafter, a process for detecting whether an event for generating a window is occurred will be described with reference to a screen configuration illustrated in FIG. 10.

Referring to FIG. 9, when an application program list 1000 managed by a task manager is displayed on the display module 150 as illustrated in FIG. 10 in operation 401 of FIG. 4, the electronic device identifies whether an application program to be executed is selected from the application program application in operation 901. For example, the electronic device can identify whether a touch input 1010 for executing the application program in the application program list displayed on the display module 150 is detected as illustrated in FIG. 10.

When the application program is not selected in operation 901, the electronic device maintains the display of the application program list 1000 in operation 401 of FIG. 4. In this case, the electronic device changes the display of the application program list based on a viewing angle of the user. For example, the electronic device can display the change in the viewing angle of the user by controlling a layout of the application program list 1000 to be asymmetric based on the viewing angle of the user as illustrated in FIG. 10.

When the selection for the application program is detected in operation 901, the electronic device identifies whether the viewing angle of the user is included in a second predetermined range in operation 903. For example, the electronic device can identify whether the viewing angle of the user is included in the second predetermined range at the time when the application program is selected as illustrated in FIG. 10. The second predetermined range refers to a reference angle range for determining whether the window is generated.

When the viewing angle of the user is included in the second predetermined range in operation 903, the electronic device generates a window including at least one service screen in operation 405 of FIG. 4. For example, the electronic device can generate a window including a service screen corresponding to the application program selected from the application program list. When the window is generated, the electronic device displays the service screen 650 included in the window of the plurality of windows corresponding to the second predetermined range on the display module 150 as illustrated in FIG. 6D. At this time, when the viewing angle of the user changes, the electronic device transforms or adds a graphic element displayed on the display module 150 and displays the change in the viewing angle of the user. For example, the electronic device can display information on the viewing angle of the user recognized by the electronic device by controlling a layout of the service screen 650 to be asymmetric based on the viewing angle of the user as indicated by reference numeral 630 in FIG. 6D.

When the viewing angle of the user is not included in the second predetermined range in operation 903, the electronic device switches the service screen of the first window displayed on the display module 150 to a service screen of the application program in operation 905.

Figure 11:
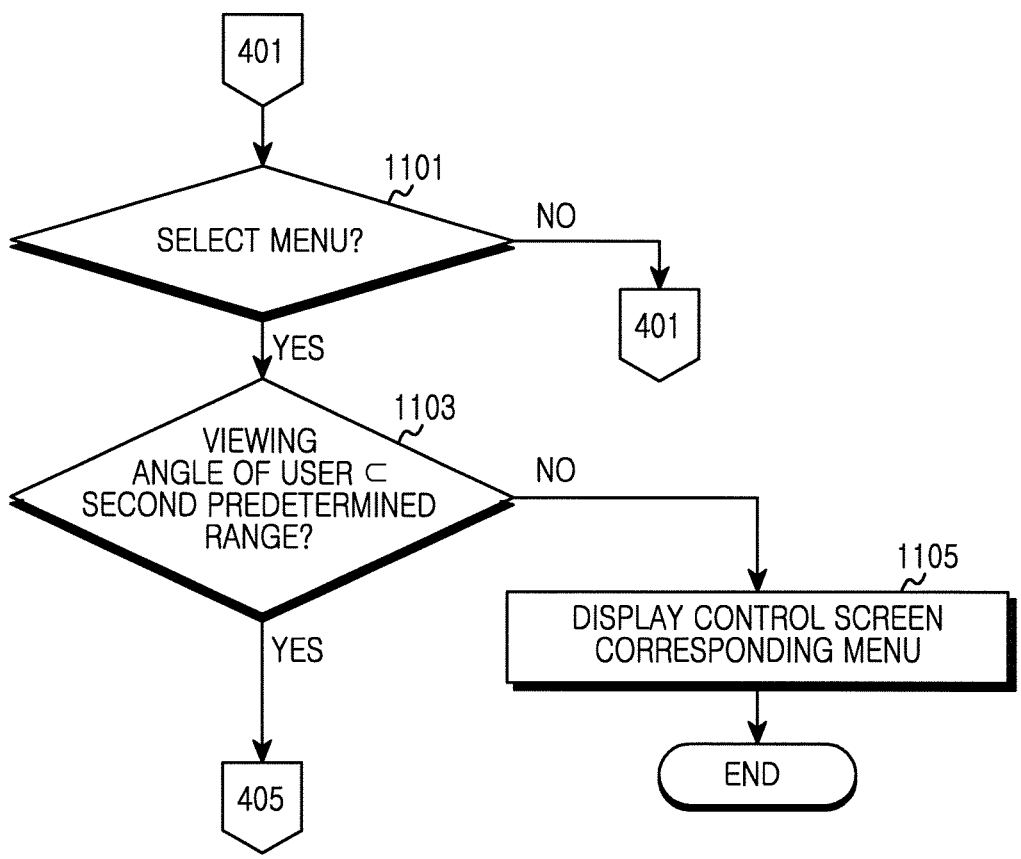
FIG. 11 illustrates a process in which an electronic device detects the occurrence of an event for generating a window based on menu selection information according to various embodiments of the present disclosure.

FIG. 11 illustrates a process in which an electronic device detects the occurrence of an event for generating a window based on menu selection information according to various embodiments of the present disclosure. Hereinafter, a process for detecting whether an event for generating a window is occurred will be described with reference to screen configurations illustrated in FIGS. 12A to 12D.

Referring to FIG. 11, when a service screen 1200 according to the execution of an application program is displayed on the display module 150 as illustrated in FIG. 12A in operation 401 of FIG. 4, the electronic device identifies whether a menu is selected in operation 1101. For example, the electronic device can identify whether selection for a "list" icon 1210 is selected on a service screen 1200 of the application program displayed on the display module 150 as illustrated in FIG. 12A.

When the menu is not selected in operation 1101, the electronic device displays a service screen according to the execution of the application program on the display module in operation 401 of FIG. 4.

When the menu is selected in operation 1101, the electronic device identifies whether the viewing angle of the user is included in a second predetermined range in operation 1103. For example, the electronic device can identify whether the viewing angle of the user is included in the second predetermined range at the time when the menu is selected as illustrated in FIG. 12A. The second predetermined range refers to a reference angle range for determining whether the window is generated.

Figure 12B:
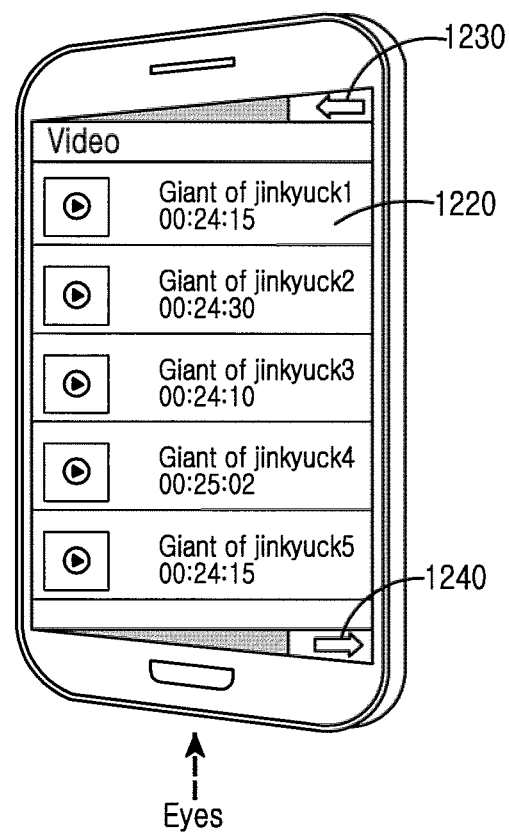

When the viewing angle of the user is included in the second predetermined range in operation 1103, the electronic device generates a window including at least one service screen in operation 405 of FIG. 4. For example, the electronic device can generate a window including a control screen corresponding to the selected menu. When the window is generated, the electronic device displays a control screen 1220 of the window of the plurality of windows corresponding to the second predetermined range on the display module 150 as illustrated in FIG. 12B. At this time, when the viewing angle of the user changes, the electronic device displays the change in the viewing angle of the user by changing a graphic element displayed on the display module 150. For example, the electronic device can display information on the viewing angle of the user recognized by the electronic device by controlling a layout of the service screen 1220 to be asymmetric based on the viewing angle of the user as illustrated in FIG. 12B.

When the viewing angle of the user is not included in the second predetermined range in operation 1103, the electronic device switches the service screen of the first window displayed on the display module 150 to a control screen corresponding to the menu in operation 1105.

Figure 12C:
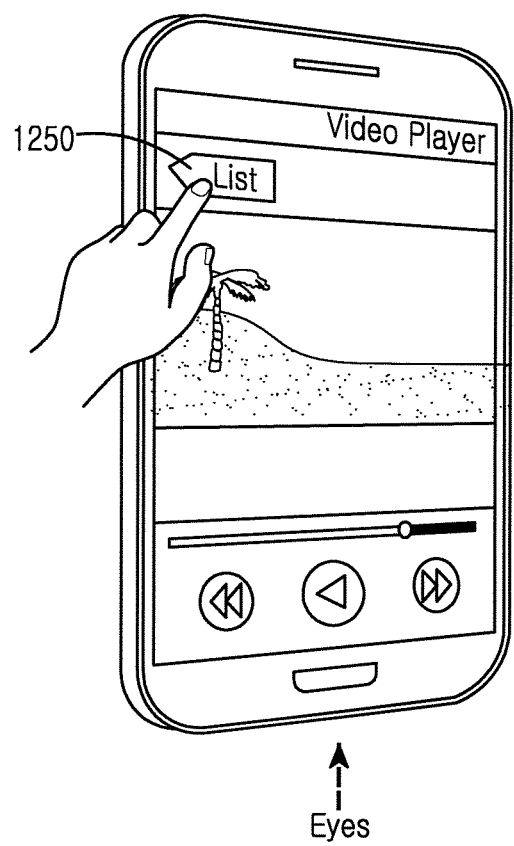
Figure 12D:
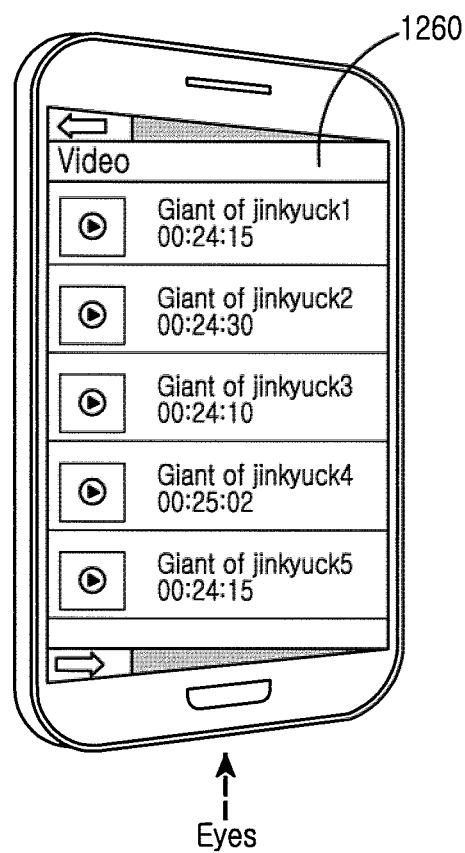

In the above described embodiment, the electronic device generates the window based on the menu selection and display the service screen of the window corresponding to the viewing angle of the user on the display module 150. At this time, as illustrated in FIGS. 12A and 12C, the electronic device transforms menu icons 1210 and 1250 to display directions of windows which are not shown. For example, when the menu icon 1210 points a right direction as illustrated in FIG. 12A, the electronic device can display a service screen 1220 of the window in a right direction as illustrated in FIG. 12B as the viewing angle of the user is changed to a right direction. In another example, when the menu icon 1250 points a left direction as illustrated in FIG. 12C, the electronic device can display a service screen 1260 of the window in a left direction as illustrated in FIG. 12D as the viewing angle of the user is changed to a left direction.

Figure 13:
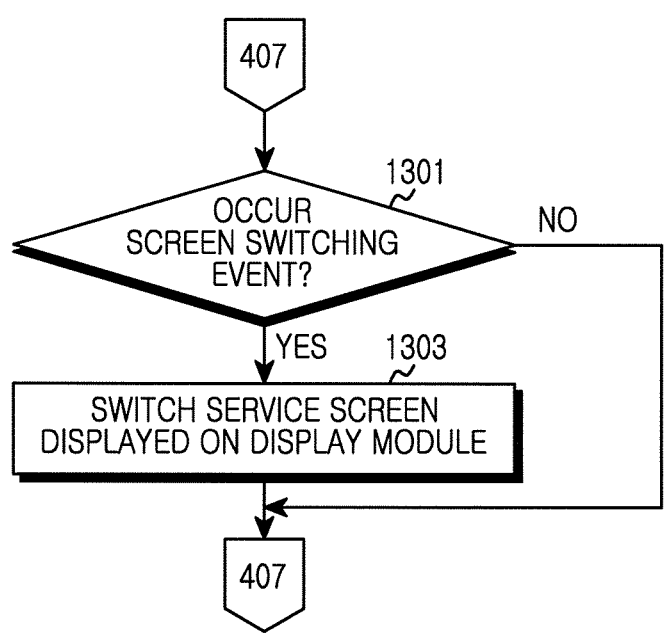
FIG. 13 illustrates a process in which an electronic device switches a window configuration according to various embodiments of the present disclosure.

FIG. 13 illustrates a process in which an electronic device switches the window configuration according to various embodiments of the present disclosure.

Referring to FIG. 13, when a service screen of at least one window corresponding to the viewing angle of the user is displayed on the display module 150 in operation 407 of FIG. 4, the electronic device identifies whether a screen switching event is occurred in operation 1301. For example, when the service screen 650 of the notification information included in the window corresponding to the second predetermined range is displayed on the display module 150 as illustrated in FIG. 6D, the electronic device can identify whether selection for the switching icon 660 or 670 for the service screen 650 is detected. In another example, the electronic device can identify whether a gesture corresponding to the service screen switching is detected. The gesture includes at least one piece of touch information provided through the input module (input interface) 140, motion information of the electronic device detected through the sensor module 170, and motion information of the user detected through the sensor module 170.

When the screen switching event is not occurred in operation 1301, the electronic device displays a service screen of at least one window corresponding to the viewing angle of the user on the display module in operation 407 of FIG. 4.

When the screen switching event is occurred in operation 1301, the electronic device switches the service screen of the window displayed on the display module 150 to another service screen according to the screen switching event in operation 1303. For example, when an input of the switching icon 670 of FIG. 6D is detected, the electronic device can switch the service screen 650 of the window to another service screen based on the input of the switching icon 670.

Figure 14A:
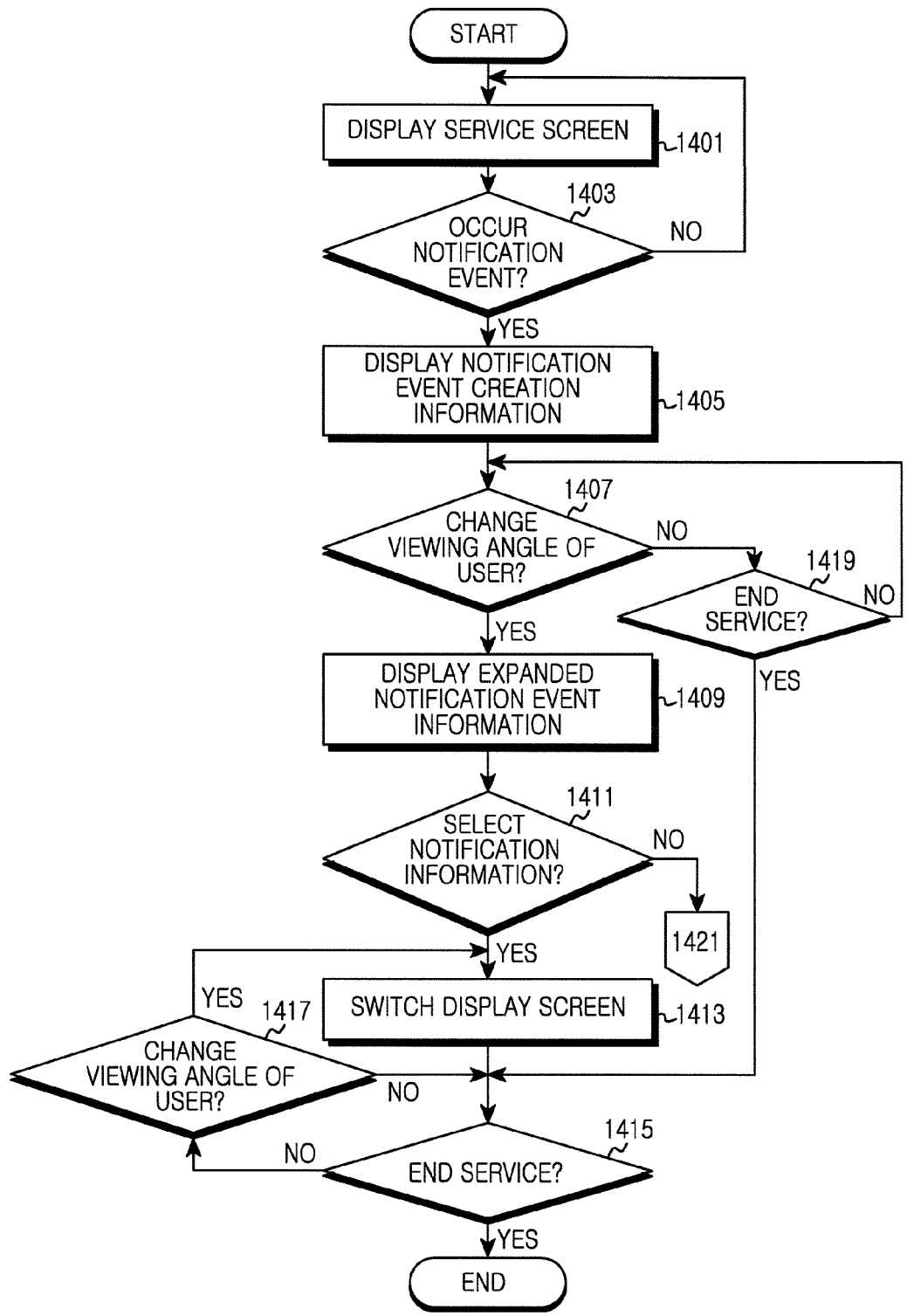
FIGS. 14A and 14B illustrate a process in which an electronic device displays notification information according to various embodiments of the present disclosure.
Figure 14B:
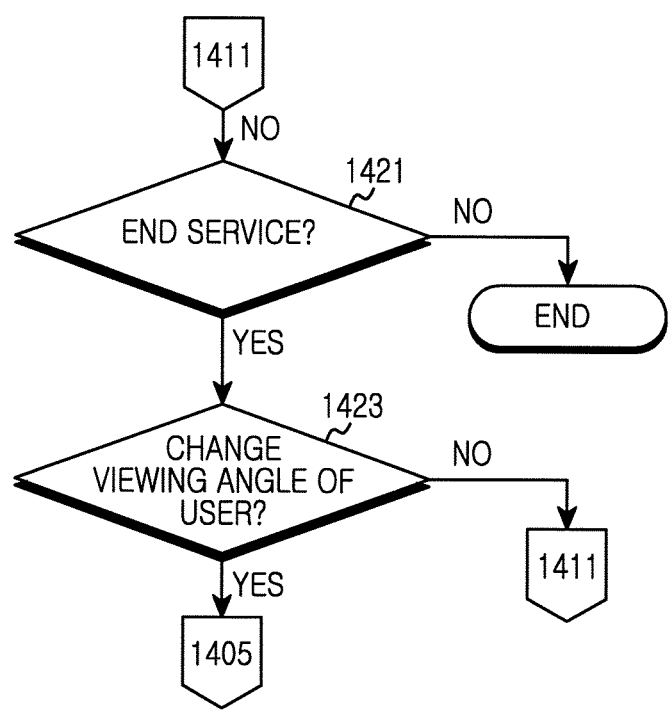

FIGS. 14A and 14B illustrate a process in which the electronic device displays notification information according to various embodiments of the present disclosure. Hereinafter, a process for displaying notification information will be described with reference to screen configurations illustrated in FIGS. 15A to 15D.

Referring to FIG. 14A, the electronic device (for example, the electronic device 100 of FIG. 1) displays a service screen on the display module 150 in operation 1401. For example, the electronic device can display an idle screen 1500 (for example, a time notification screen) on the display module 150 as illustrated in FIG. 15A.

The electronic device identifies whether a notification event is occurred in operation 1403. For example, the electronic device can identify whether a notification event corresponding to message reception is occurred. In another example, the electronic device can identify whether a notification event is occurred based on schedule configuration information. In still another example, the electronic device can identify whether a notification event corresponding to call reception is occurred.

When the notification event is not occurred in operation 1403, the electronic device maintains the display of the service screen in operation 1401.

Figure 15B:
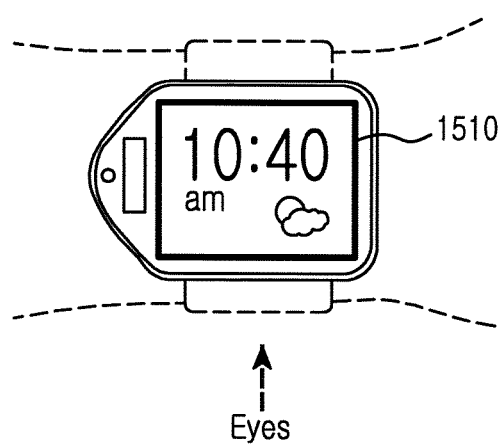

When the notification event is occurred in operation 1403, the electronic device displays notification event occurrence information on the display module in operation 1405. For example, when the notification event corresponding to the message reception is occurred, the electronic device can change a graphic element of an edge 1510 of the service screen and display notification event occurrence information on the display module 150 as illustrated in FIG. 15B.

The electronic device identifies whether the viewing angle of the user changes in operation 1407. For example, the electronic device can identify whether the viewing angle of the user changes based on a range including the viewing angle of the user.

When the viewing angle of the user does not change in operation 1407, the electronic device identifies whether the service ends in operation 1419.

The electronic device identifies whether the service ends in operation 1419.

When the service does not end in operation 1419, the electronic device identifies whether the viewing angle of the user changes in operation 1407.

When the service ends in operation 1419, the electronic device ends the algorithm.

When the viewing angle of the user changes in operation 1407, the electronic device displays expanded notification event information on the display module in operation 1409. For example, when the viewing angle of the user is changed to the second predetermined range as illustrated in FIG. 15B, the electronic device can display notification event information 1520 including abstract information on the received message (for example, sender information, the number of received message or the like) on the display module 150 as illustrated in FIG. 5C.

Figure 15C:
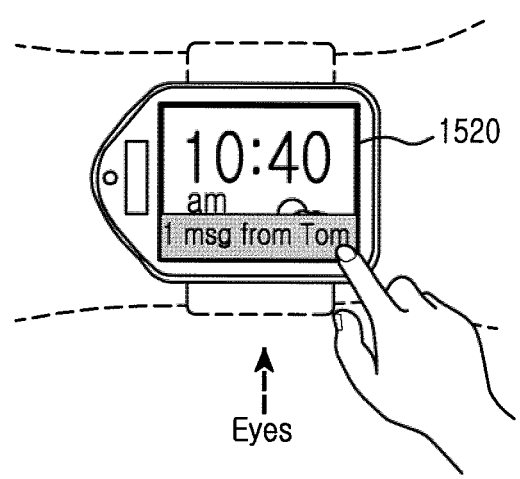

The electronic device identifies whether selection for the notification information is detected in operation 1411. For example, the electronic device 100 can identify whether the selection for the notification information is detected based on input information detected through the input module 140. For example, the electronic device 100 can identify whether a touch input for the expanded notification event information 1520 is detected through the input module 140 as illustrated in FIG. 15C.

When the selection for the notification information is not detected in operation 1411, the electronic device identifies whether the service ends in operation 1421 of FIG. 14B.

When the service ends in operation 1421, the electronic device ends the algorithm.

When the service does not end in operation 1421, the electronic device identifies whether the viewing angle of the user changes in operation 1423. For example, the electronic device can identify whether the viewing angle of the user changes based on a range including the viewing angle of the user.

When the viewing angle of the user changes in operation 1423, the electronic device displays a service screen including notification event occurrence information on the display module 150 in response to the change in the viewing angle of the user in operation 1405.

When the viewing angle of the user does not change in operation 1423, the electronic device identifies whether the selection for the notification information is detected in operation 1411.

Figure 15D:
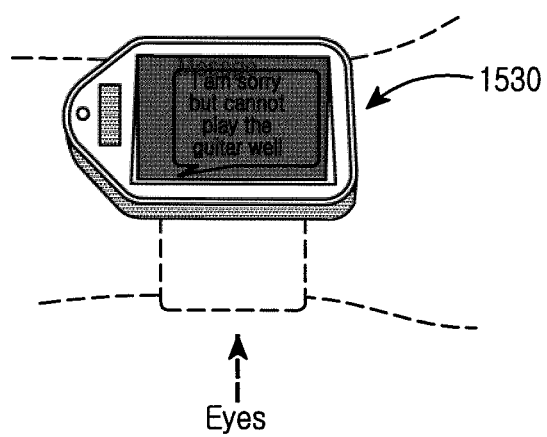

When the selection for the notification information is detected in operation 1411, the electronic device displays a service screen corresponding to the notification event on the display module 150 in operation 1413. For example, the electronic device can generate a second window including a notification service screen (for example, a message reception screen) corresponding to the notification event. The electronic device displays the notification service screen 1530 included in the second window on the display module 150 as illustrated in FIG. 15D.

The electronic device identifies whether the service ends in operation 1415.

When the service does not end in operation 1415, the electronic device identifies whether the viewing angle of the user changes in operation 1417.

When the viewing angle of the user does not change in operation 1417, the electronic device identifies whether the service ends in operation 1415.

When the viewing angle of the user changes in operation 1417, the electronic device displays a service screen of at least one of the plurality of windows corresponding to the changed viewing angle of the user on the display module 150 in operation 1413. For example, the electronic device can display a message screen of the first window corresponding to the changed viewing angle of the user on the display module 150 as illustrated in FIG. 15A.

When the service ends in operation 1415, the electronic device ends the algorithm.

In the above described embodiment, the electronic device transforms the graphic element of the edge of the service screen and displays the notification event occurrence information. At this time, the electronic device displays the notification event occurrence information on the display module 150 by using at least one of an icon, a screen color, and screen brightness as well as the graphic element of the edge of the service screen.

Figure 16:
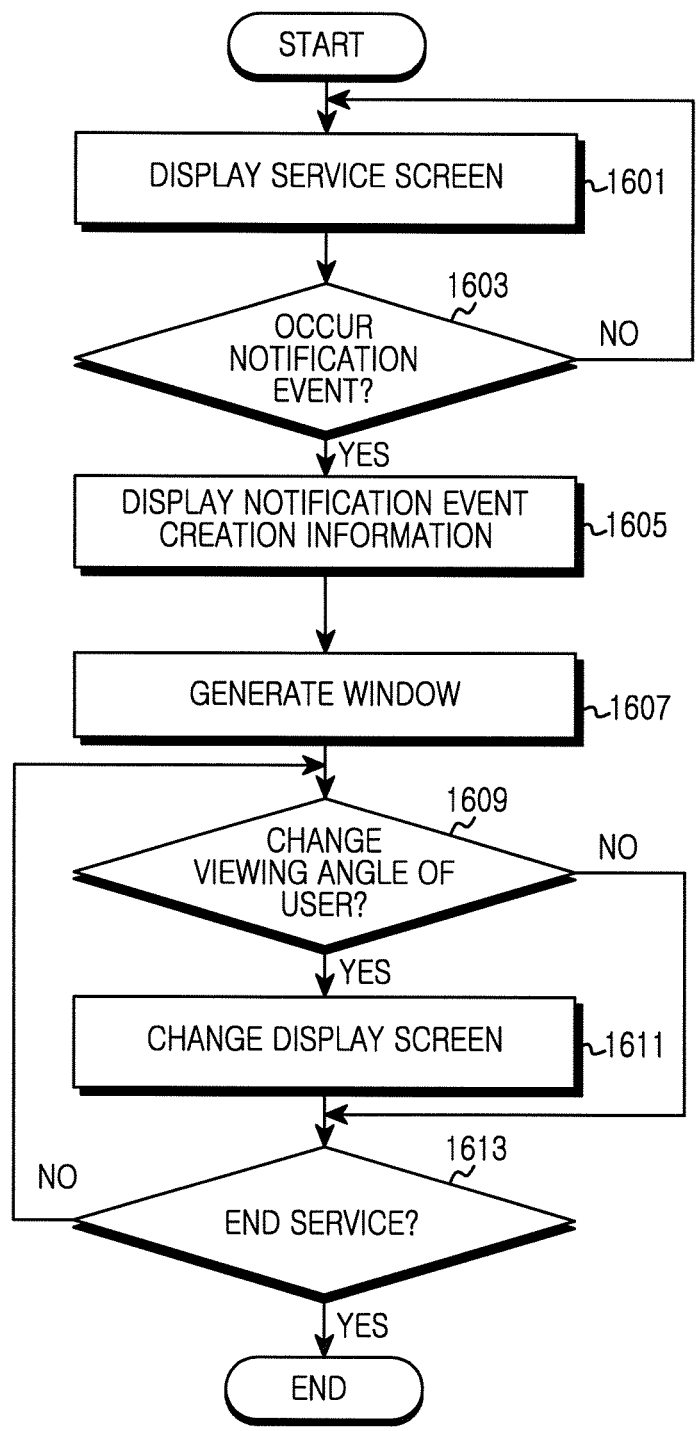
FIG. 16 illustrates a process in which an electronic device generates a window based on notification information according to various embodiments of the present disclosure.

FIG. 16 illustrates a process in which an electronic device generates a window based on notification information according to various embodiments of the present disclosure.

Referring to FIG. 16, the electronic device displays a service screen on the display module 150 in operation 1601. For example, the electronic device can display dynamic image screens 600 and 1200 reproduced by a dynamic image reproduction program as illustrated in FIGS. 6A and 12A. In another example, the electronic device can display an application program list 1000 managed by a task manager on the display module 150 as illustrated in FIG. 10. In still another example, the electronic device can display an idle screen 1500 of the electronic device on the display module 150 as illustrated in FIG. 15A.

The electronic device identifies whether a notification event is occurred in operation 1603. For example, the electronic device can identify whether a notification event corresponding to message reception is occurred. In another example, the electronic device can identify whether a notification event is occurred based on schedule configuration information. In still another example, the electronic device can identify whether a notification event corresponding to call reception is occurred.

When the notification event is not occurred in operation 1603, the electronic device maintains the display of the service screen in operation 1601.

When the notification event is occurred in operation 1603, the electronic device displays notification event information on the display module in operation 1605. For example, when a notification event corresponding to message reception is occurred, the electronic device can display event occurrence information corresponding to the message reception on the display module 150 by using at least one of an icon, a screen color, a screen edge color, and screen brightness.

Further, when the notification event is occurred, the electronic device generates a screen including at least one notification service screen corresponding to the notification event in operation 1607. For example, when the notification event corresponding to the message reception is occurred, the electronic device can generate a window including a message reception screen.

The electronic device identifies whether the viewing angle of the user changes in operation 1609. For example, the electronic device can identify whether a predetermined range including the viewing angle of the user changes.

When the viewing angle of the user does not change in operation 1609, the electronic device identifies whether the service ends in operation 1613.

When the viewing angle of the user changes in operation 1609, the electronic device displays a service screen of at least one of the plurality of windows corresponding to the viewing angle of the user on the display module 150 in operation 1611.

The electronic device identifies whether the service ends in operation 1613.

When the service does not end in operation 1613, the electronic device identifies whether the viewing angle of the user changes in operation 1609.

When the service ends in operation 1613, the electronic device ends the algorithm.

Figure 17:
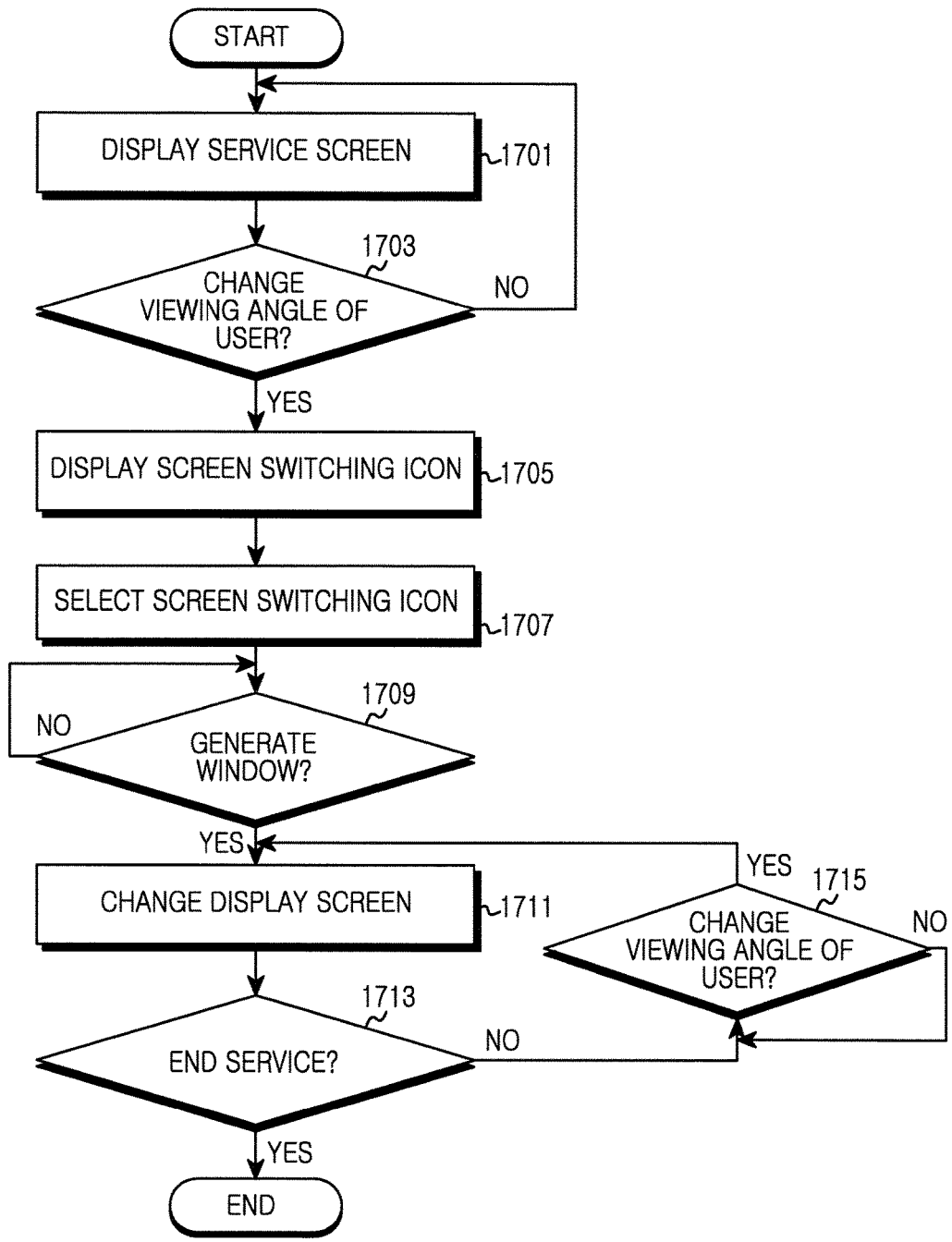
FIG. 17 illustrates a process in which an electronic device generates a window based on a change in a viewing angle of a user according to various embodiments of the present disclosure.

FIG. 17 illustrates a process in which an electronic device generates a window based on a change in a viewing angle of the user according to various embodiments of the present disclosure. Hereinafter, a process for generating a window will be described with reference to screen configurations illustrated in FIGS. 18A to 18F.

Referring to FIG. 17, the electronic device displays a service screen on the display module 150 in operation 1701. For example, the electronic device can display a message screen 1800 by a messenger program on the display module 150 as illustrated in FIG. 18A.

The electronic device identifies whether the viewing angle of the user changes in operation 1703. For example, the electronic device can identify whether a predetermined range including the viewing angle of the user changes.

When the viewing angle of the user does not change in operation 1703, the electronic device maintains the display of the service screen in operation 1701.

Figure 18B:
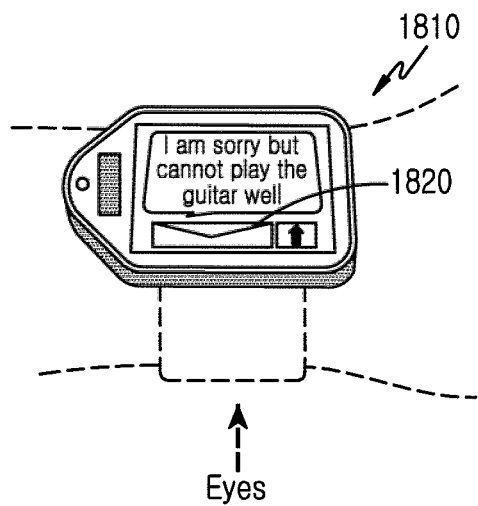

When the viewing angle of the user changes in operation 1703, the electronic device displays a screen switching icon on the display module in operation 1705. For example, when the viewing angle of the user changes, the electronic device can display a screen switching icon 1820 on at least the part of the display module 150 as illustrated in FIG. 18B. For example, the electronic device can display the screen switching icon 1820 to show a screen switching direction.

Figure 18C:
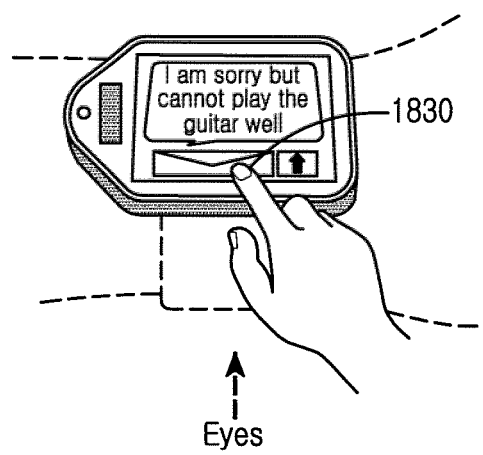

The electronic device identifies whether the screen switching icon is selected according to input information provided from the input module (input interface) 140 in operation 1707. For example, the electronic device can identify whether a touch input 1830 of the screen switching icon 1820 is detected as illustrated in FIG. 18C.

When the screen switching icon is selected in operation 1707, the electronic device generates a window including at least one service screen in operation 1709. For example, the electronic device can generate a window including at least one service screen corresponding to the service screen displayed on the display module 150 at the time when the viewing angle of the user changes.

Figure 18D:
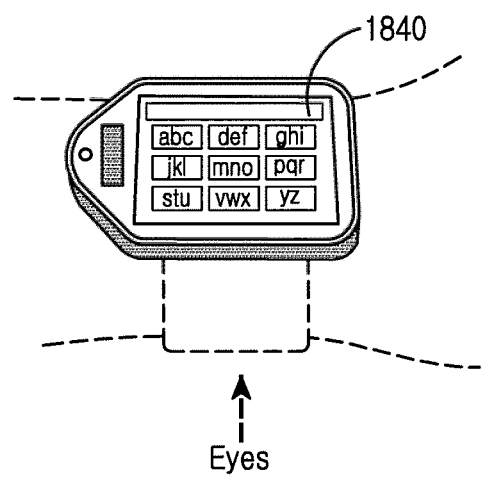
Figure 18E:
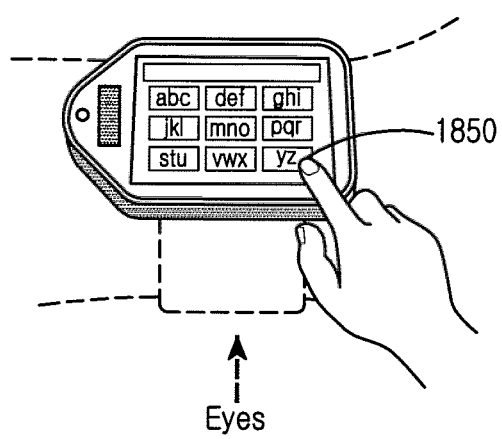

The electronic device displays a service screen of at least one of the plurality of windows corresponding to the viewing angle of the user on the display module 150 in operation 1711. For example, the electronic device can display a virtual keypad 1840 of the window corresponding to the second predetermined range on the display module 150 as illustrated in FIG. 18D. In this case, the electronic device displays at least a part 1850 of a message input screen on the display module 150 to allow the user to identify a message input through the virtual keypad 1840 as illustrated in FIG. 18E.

The electronic device identifies whether the service ends in operation 1713.

When the service does not end in operation 1713, the electronic device identifies whether the viewing angle of the user changes in operation 1715.

When the viewing angle of the user does not change in operation 1715, the electronic device identifies whether the service ends in operation 1713.

When the viewing angle of the user changes in operation 1715, the electronic device displays a service screen of at least one of the plurality of windows corresponding to the changed viewing angle of the user on the display module 150 in operation 1711. For example, the electronic device can display a message screen of the first window corresponding to the changed viewing angle of the user on the display module 150 as illustrated in FIG. 18A.

When the service ends in operation 1713, the electronic device ends the algorithm.

Figure 18F:
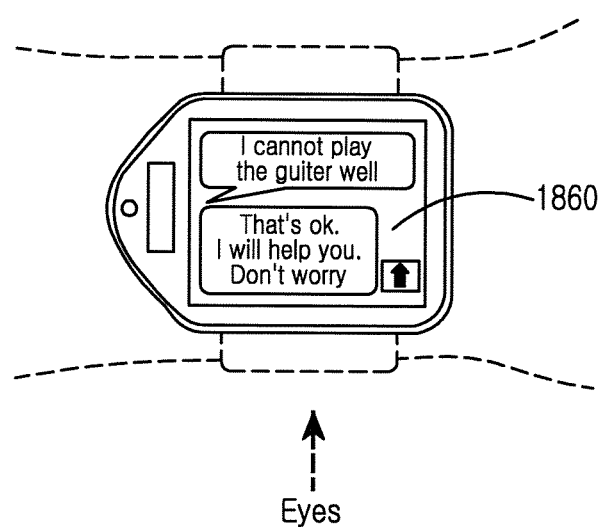

In the above described embodiment, when the virtual keypad 1840 is displayed on the display module 150 in accordance with the viewing angle of the user as illustrated in FIG. 18D, the electronic device displays at least the part 1850 of the message input screen (for example, last sentence of the input message) on the display module 150 as illustrated in FIG. 18E. When the viewing angle of the user changes while the message is input using the virtual keypad 1840, the electronic device displays a message screen 1860 including text contents input using the virtual keypad 1840 as illustrated in FIG. 18F.

In the above described embodiment, the electronic device displays at least one service screen included in one of a plurality of windows on the display module 150 based on the viewing angle of the user with respect to the electronic device.

In another embodiment, the electronic device simultaneously displays a plurality of service screens corresponding to a plurality of service windows on the display module 150 based on the viewing angle of the user with respect to the electronic device. For example, the electronic device including a polarizing display module can display a first window including at least one first service screen on a polarizing display module 150. When an event for generating a window is occurred, the electronic device generates a second window including at least one second service screen. When the second window is generated, the electronic device simultaneously displays the first service screen and the second service screen corresponding to the first window and the second window on the polarizing display module 150 such that the first service screen and the second service screen correspond to different viewing angles. Accordingly, the user views the first service screen or the second service screen based on the viewing angle of the user. At this time, the electronic device adds and transforms a graphic element and display the viewing angle of the user recognized by the electronic device on the display module 150.

Figure 19A:
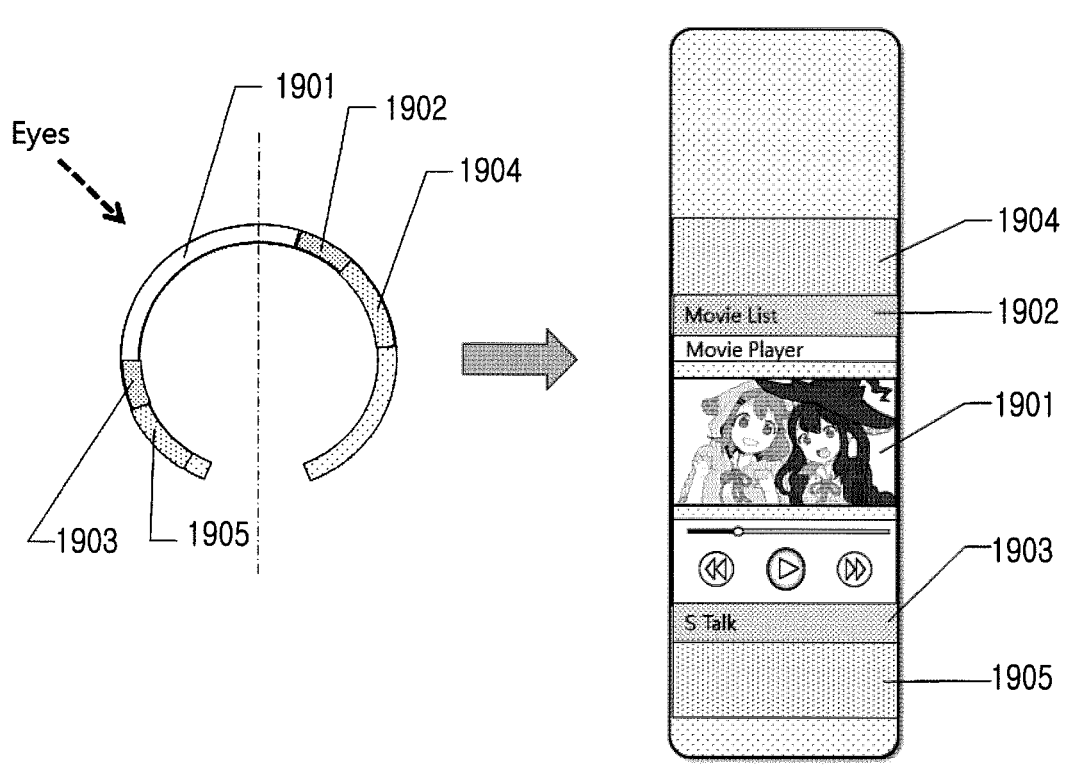
FIGS. 19A and 19B illustrate screen configurations in which a flexible device displays a window according to various embodiments of the present disclosure.
Figure 19B:
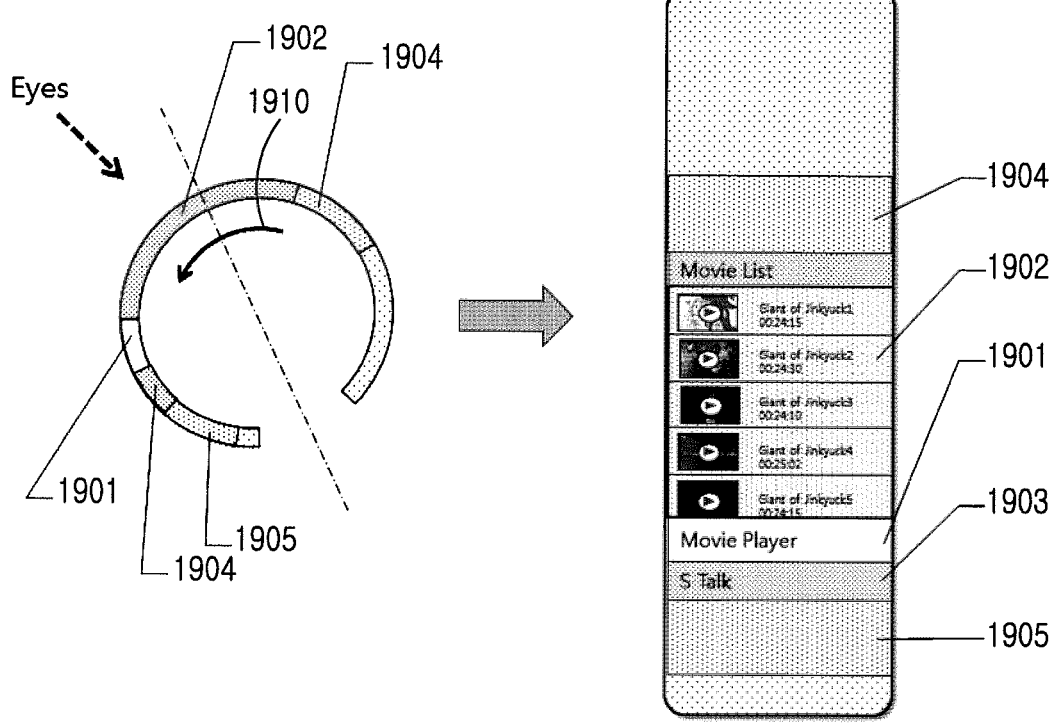

In another embodiment, the electronic device displays the service screen included in at least one window of the plurality of windows and at least a part of the service screen included in another window on the display module 150. For example, a flexible device including a curved display module can display a service screen included in a window according to the viewing angle of the user as illustrated in FIGS. 19A and 19B. A curved device including a curved display module displays a service screen included in a window like the flexible device.

FIGS. 19A and 19B illustrate a process in which a flexible device displays a window according to various embodiments of the present disclosure.

Referring to FIG. 19A, when a display module of the flexible device is a curved display module, the flexible device displays a service screen of a window 1901 corresponding to the viewing angle of the user. The flexible device displays at least one of a part of service screens for windows 1902, 1903, 1904, and 1905 having a viewing angle which does not match the viewing angle of the user, an icon, and a thumbnail. At this time, the flexible device configures different display schemes of the service screens according to whether the service screens are closed to the viewing angle of the user.

When the viewing angle of the user changes as indicated by reference numeral 1910 in FIG. 19B, the flexible device expands and displays the service screen of the window 1902 corresponding to the viewing angle of the user. The flexible device displays at least one of a part of service screens for windows 1901, 1903, 1904, and 1905 having a viewing angle which does not match the viewing angle of the user, an icon, and a thumbnail.

In the above described embodiment, the electronic device controls the layout of the screen displayed on the display module 150 to be asymmetric based on the viewing angle of the user in order to display the change in the viewing angle of the user recognized by the electronic device.

In another embodiment, the electronic device displays the viewing angle of the user recognized by the electronic device by using graphic elements including at least one of an arrow, icon, screen color, screen edge color, and screen brightness.

In the above described embodiment, the electronic device generates the window when the event for generating the window is occurred. At this time, the electronic device selectively generates the window based on whether a window supporting menu is configured. For example, when the event for generating the window is occurred, the electronic device can identify whether the window supporting menu is configured. When the window supporting menu is configured, the electronic device generates the window.

As described above, the electronic device generates at least one service screen based on the viewing angle of the user and switches the service screen displayed on the display module based on the viewing angle of the user, so as to efficiently display a plurality of service screens without reducing the amount and size of information displayed on the display module and conveniently support multitasking by using a display area having a limited size.

Meanwhile, although concrete various embodiments have been described in the detailed description of the present disclosure, operation sequences of the electronic device can be changed, combined, or re-performed and may be variously modified such as omission without departing from the scope of the present disclosure. Therefore, the scope of the present disclosure should not be defined as being limited to the embodiments, but should be defined by the appended claims and equivalents thereof.

What is claimed is:

1. An electronic device comprising:
   a polarizing display;
   a sensor configured to detect a viewing angle of a user relative to the polarizing display; and
   a processor configured to:

control the polarizing display to display a first service screen included in a first window when the detected viewing angle of the user relative to the polarizing is first viewing angle, control the polarizing display to display a second service screen included in a second window when the detected viewing angled of the user relative to the polarizing display is a second viewing angle.

2. The electronic device of claim 1, wherein the processor is configured to control the polarizing display to display the second service screen included in the second window when an event for executing a service occurs in a state where the first service screen is displayed on the first window.

3. The electronic device of claim 1, wherein the processor is configured to control the polarizing display to display the second service screen corresponding to a notification event included in the second window when the notification event occurs in a state where the first service screen is displayed on the first window.

4. The electronic device of claim 1, wherein the processor is configured to control the polarizing display to the second service screen included in the second window when the viewing angle of the user relative to the electronic device changes in a state where the first service screen is displayed on the first window.

5. An electronic device comprising:
a display module; and
a sensor configured to detect a viewing angle of a user relative to the electronic device;
a processor configured to:
control the display module to display a first service screen included in a first window on a display screen,
generate a second window on the display screen including a second service screen, and
control the display module to display the first service screen or the second service screen according to the detected viewing angle of the user relative to the electronic device.

6. The electronic device of claim 5, wherein the processor is further configured to:
estimate the viewing angle of the user relative to the electronic device;
generate the second window including the second service screen; and
control the display module to display one of the first service screen or the second service screen according to the viewing angle of the user relative to the electronic device.

7. The electronic device of claim 6, wherein the sensor comprises at least one of a motion sensor acquiring an information on a motion of the electronic device or an image sensor acquiring an image on the user.

8. The electronic device of claim 5, wherein the processor is configured to:
determine whether to generate the second window based on the viewing angle of the user relative to the electronic device when an event for executing a service occurs in a state where the first service screen is displayed on the display module, and
generate the second window including the second service screen corresponding to the event for executing the service when there is the determination to generate the second window.

9. The electronic device of claim 5, wherein the processor is configured to generate the second window including the second service screen corresponding to a notification event when the notification event occurs in a state where the first service screen is displayed on the display module.

10. The electronic device of claim 5, wherein the processor is configured to generate the second window including the second service screen that matches the first service screen when the viewing angle of the user relative to the electronic device changes in a state where the first service screen is displayed on the display module.

11. The electronic device of claim 5, wherein the processor is configured to control the display module to display the first service screen included in the first window corresponding to a first predetermined range when the viewing angle of the user relative to the electronic device is included in the first predetermined range, and control the display module to display the second service screen included in the second window corresponding to a second predetermined range when the viewing angle of the user relative to the electronic device is included in the second predetermined range.

12. The electronic device of claim 5, wherein the processor is configured to control the display module to transform a layout of at least some areas of the service screen displayed on the display module in accordance with the viewing angle of the user relative to the electronic device.

13. The electronic device of claim 5, wherein the processor is configured to switch the service screen of the window displayed on the display module to another service screen when a screen switching event occurs.

14. The electronic device of claim 5, wherein the processor is configured to switch the service screen of the window displayed on the display module to a service screen of another window corresponding to the changed viewing angle of the user when the viewing angle of the user relative to the electronic device changes.

* * * * *